US011347877B2

(12) United States Patent
Mahalle

(10) Patent No.: US 11,347,877 B2
(45) Date of Patent: May 31, 2022

(54) METHODS AND SYSTEMS FOR FACILITATING SHARING OF DIGITAL DOCUMENTS BETWEEN A SHARING PARTY AND A RELYING PARTY

(71) Applicant: Mastercard International Incorporated, Purchase, NY (US)

(72) Inventor: Rajesh Pralhadrao Mahalle, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 470 days.

(21) Appl. No.: 16/390,400

(22) Filed: Apr. 22, 2019

(65) Prior Publication Data

US 2019/0332791 A1   Oct. 31, 2019

(51) Int. Cl.
| | |
|---|---|
| H04L 9/40 | (2022.01) |
| G06F 21/62 | (2013.01) |
| G06F 16/176 | (2019.01) |
| H04L 9/08 | (2006.01) |
| G06F 21/60 | (2013.01) |
| G06F 16/93 | (2019.01) |

(52) U.S. Cl.
CPC ........ G06F 21/6218 (2013.01); G06F 16/176 (2019.01); G06F 16/93 (2019.01); G06F 21/602 (2013.01); H04L 9/0861 (2013.01)

(58) Field of Classification Search
CPC ... H04L 9/0861; G06F 21/602; G06F 21/176; G06F 21/6218; G06F 16/93
USPC ........................................................ 713/165
See application file for complete search history.

(56) References Cited

U.S. PATENT DOCUMENTS

| | | | | |
|---|---|---|---|---|
| 9,473,505 | B1* | 10/2016 | Asano | H04L 63/102 |
| 2002/0016910 | A1* | 2/2002 | Wright | H04L 63/0442 |
| | | | | 713/150 |
| 2002/0031230 | A1* | 3/2002 | Sweet | H04L 63/102 |
| | | | | 380/278 |
| 2002/0194485 | A1* | 12/2002 | Ram | G06F 21/6209 |
| | | | | 713/193 |

(Continued)

OTHER PUBLICATIONS

NPL Search Terms (Year: 2021).*

(Continued)

*Primary Examiner* — Syed A Zaidi
(74) *Attorney, Agent, or Firm* — Buckley, Maschoff & Talwalkar LLC

(57) ABSTRACT

Embodiments provide a method for facilitating sharing of digital documents between a sharing party and a relying party. The method includes receiving, by a processing system, an access request for accessing at least one attribute of a digital document. The access request is initiated at a relying party interface in a document sharing application. The method further includes sending, by the processing system, the access request to a sharing party interface in the document sharing application for approval of providing access to the at least one attribute of the digital document by the sharing party to the relying party. The method further includes, upon receiving the approval from the sharing party interface, generating a machine-readable encrypted code for the at least one attribute of the digital document. The method further includes sending the machine-readable encrypted code to the relying party interface.

19 Claims, 16 Drawing Sheets

(56) References Cited

U.S. PATENT DOCUMENTS

| | | | | |
|---|---|---|---|---|
| 2007/0250912 A1* | 10/2007 | Rassool | ............ | H04N 7/17318 726/4 |
| 2009/0156170 A1* | 6/2009 | Rossano | ................ | H04L 51/10 455/412.1 |
| 2009/0204542 A1 | 8/2009 | Doman et al. | | |
| 2010/0076950 A1* | 3/2010 | Kenedy | ................ | G06Q 30/02 707/706 |
| 2011/0099120 A1* | 4/2011 | Grossman | ............. | G06Q 10/06 705/325 |
| 2013/0272523 A1* | 10/2013 | McCorkindale | ....... | H04N 1/444 380/243 |
| 2014/0208418 A1* | 7/2014 | Libin | .................. | G06F 21/6209 726/19 |
| 2014/0282687 A1* | 9/2014 | Kummer | ........... | H04N 21/2541 725/31 |
| 2015/0089607 A1 | 3/2015 | Hubner et al. | | |
| 2015/0172266 A1* | 6/2015 | Krug | ...................... | H04L 51/32 726/4 |
| 2016/0085978 A1* | 3/2016 | Meyer | ................ | H04L 63/0861 726/28 |
| 2017/0041296 A1* | 2/2017 | Ford | ..................... | G06F 16/951 |
| 2017/0200122 A1* | 7/2017 | Edson | .................. | H04L 63/104 |
| 2017/0237717 A1* | 8/2017 | Starosielsky | ........ | G06F 21/602 713/176 |
| 2017/0250972 A1* | 8/2017 | Ronda | ...................... | H04L 9/08 |
| 2017/0324750 A1 | 11/2017 | Khan | | |
| 2019/0207929 A1* | 7/2019 | Koorapati | .......... | G06F 16/2246 |
| 2021/0258368 A1* | 8/2021 | Cassidy | ............. | H04L 67/1097 |

OTHER PUBLICATIONS

NPL Search Terms (Year: 2022).*
"PCT Notification of Transmittal of the International Search Report and the Written Opinion", International Searching Authority, dated Jul. 5, 2019 (dated Jul. 5, 2019), International Application No. PCT/US2019/023284, 14 pp.

* cited by examiner

METHODS AND SYSTEMS FOR FACILITATING SHARING OF DIGITAL DOCUMENTS BETWEEN A SHARING PARTY AND A RELYING PARTY

CROSS-REFERENCE TO RELATED APPLICATION

This application is a U.S. National Stage filing under 35 U.S.C. § 119, based on and claiming benefits of and priority to Singapore Patent Application No. 10201803501Q filed on Apr. 26, 2018. The entire disclosure of the above application is incorporated herein by reference for all purposes.

TECHNICAL FIELD

The present disclosure relates to digital identity documents and, more particularly to, methods and systems for sharing of digital identity documents between two parties.

BACKGROUND

In today's world, especially in India, a consumer is required to submit his/her identity proofs (government issued identity) for availing any service such as opening of bank accounts, applying for driving license, getting loans from banks, getting telephone connections to requesting parties (or service providers). The requesting parties seek the consumer's government issued identity proofs for verification of address, name, date of birth, etc. Similarly, in scenarios, where a consumer books air tickets, enters an airport, checks in to a hotel, boards a train, enters a movie theatre, he/she is asked to produce a government issued identity. This necessitates the consumer to carry a government issued identity with him/her everywhere for verification of identity.

In India, government issued identities can be documents such as passports, Permanent Account Number (PAN) cards, driving licenses, Aadhaar cards and voter identity cards, etc. Service providers seeking consumer's identity can demand the consumer to submit photocopies of any of the above-mentioned identity documents for providing services as mentioned above. Further, photocopies of these documents may be verified with the original document. As such, the consumer may also have to carry both the original documents and the photocopies for verification of the identity of the consumer by the service provider. After an identity document of the consumer is shared with the service provider, the photocopy of the identity document remains with the service provider unattended and unsecured that has a risk of being misused by unauthorized sources for fraud and malpractices with or without the knowledge of the service provider.

The above drawback can be partially eliminated with the use of digital copies of the identity documents. Although the use of digital documents eliminates the inconvenience of having to carry multiple identity documents by the consumer, the threat related to fraud still remains. Copies of identity documents or data pertaining to the identity documents remain stored as digital data in databases of the service providers to whom the consumer might have submitted copies of digital identity documents. With conventional technology, the consumer cannot control the access to the digital data by the service providers. In the current Internet environment, there are high risks of data getting compromised. For instance, the databases where such digital data are stored can be hacked and the digital data can be stolen and sold by unauthorized sources.

Furthermore, most of the time it is observed that a requesting party, such as a bank, telephone company, mobile Subscriber Identity Module (SIM) service provider, Internet Service Provider (ISP), a hotel reception, an airport security a railway ticket collector, etc., only wishes to check one or more attributes of the identity document. For example, an ISP may be interested in the address and name of the consumer, while the airport security may be interested in a photo and name of the consumer. As such, it is not necessary to share the whole digital identity document with the requesting party. However, current technologies do not provision for sharing of a portion or sharing of one or more attributes of an identity document with the requesting parties.

Accordingly, there is a need for a solution for sharing one or more attributes of a digital identity document as requested by the requesting party and at the same time for precluding illegal usage of identity information by unauthorized sources and allowing the consumer to control access to the identity information by requesting parties.

SUMMARY

Various embodiments of the present disclosure provide systems, methods, electronic devices and computer program products for facilitating sharing of one or more attributes of a digital document between a sharing party and one or more relying parties. Various embodiments provide a document sharing application that enable sharing of the one or more attributes of a digital document between a sharing party and one or more relying parties.

An embodiment provides a method for facilitating sharing of digital documents between a sharing party and a relying party. The method includes receiving, by a processing system, an access request for accessing at least one attribute of a digital document. The access request is initiated at a relying party interface in a document sharing application. The method further includes sending, by the processing system, the access request to a sharing party interface in the document sharing application for approval of providing access to the at least one attribute of the digital document by the sharing party to the relying party. The method further includes, upon receiving the approval from the sharing party interface, generating a machine-readable encrypted code for the at least one attribute of the digital document. The method further includes sending the machine-readable encrypted code to the relying party interface.

Another embodiment provides a server system for facilitating sharing of digital documents between a sharing party and a relying party. The server system includes a memory comprising stored instructions and a processor configured to execute the stored instructions to cause the server system to perform at least receiving an access request for accessing at least one attribute of a digital document, wherein the access request is initiated at a relying party interface in a document sharing application. The server system is further caused to send the access request to a sharing party interface in the document sharing application for approval of providing access to the at least one attribute of the digital document by the sharing party to the relying party. The server system is further caused to generate a machine-readable encrypted code for the at least one attribute of the digital document upon receiving the approval from the sharing party interface and send the machine-readable encrypted code to the relying party interface.

Another embodiment provides another method for facilitating sharing of digital documents between a sharing party and a relying party. The method includes sending, from a relying party interface, an access request for accessing at least one attribute of a digital document, wherein the access request is sent in a document sharing application. The method further includes receiving a machine-readable encrypted code in response to the access request for accessing the at least one attribute of the digital document in the document sharing application. The machine-readable encrypted code encrypts the at least one attribute of the digital document and a time period for which the at least one attribute of the digital document is requested by the relying party. The method further includes endorsing the at least one attribute of the digital document and sending an endorsement notification of endorsing the at least one attribute of the digital document to a sharing party interface in the document sharing application. The method further includes deleting the at least one attribute of the digital document upon expiry of the time period for which the at least one attribute of the digital document is requested by the relying party.

Another embodiment provides yet another method for facilitating sharing of digital documents between a sharing party and a relying party. The method includes receiving, by a processing system, an access request for accessing at least one attribute of a digital document. The access request is initiated at a relying party interface in a document sharing application. The method further includes sending, by the processing system, the access request to a sharing party interface in the document sharing application for approval of providing access to the at least one attribute of the digital document by the sharing party to the relying party. The method further includes, upon receiving the approval from the sharing party interface, facilitating masking of attributes other than the at least attribute of the digital document and providing access to the at least one attribute of the digital document to the relying party, wherein access to the attributes other than the at least one attributes are not provided to the relying party.

Another embodiment provides yet another method for facilitating sharing of digital documents between a sharing party and a relying party. The method includes receiving, by a processing system, an access request for accessing at least one attribute of a digital document. The access request is initiated at a relying party interface in a document sharing application. The method further includes sending, by the processing system, the access request to a sharing party interface in the document sharing application for approval of providing access to the at least one attribute of the digital document by the sharing party to the relying party. The method further includes, upon receiving the approval from the sharing party interface, facilitating access to the at least one attribute of the digital document to the relying party for a pre-defined time period, wherein facilitating access to the at least one attribute further comprises masking attributes other than the at least one attribute of the digital document. The method further includes facilitating endorsement of the at least one attribute by the relying party.

BRIEF DESCRIPTION OF THE FIGURES

For a more complete understanding of example embodiments of the present technology, reference is now made to the following descriptions taken in connection with the accompanying drawings in which.

Figure 1:
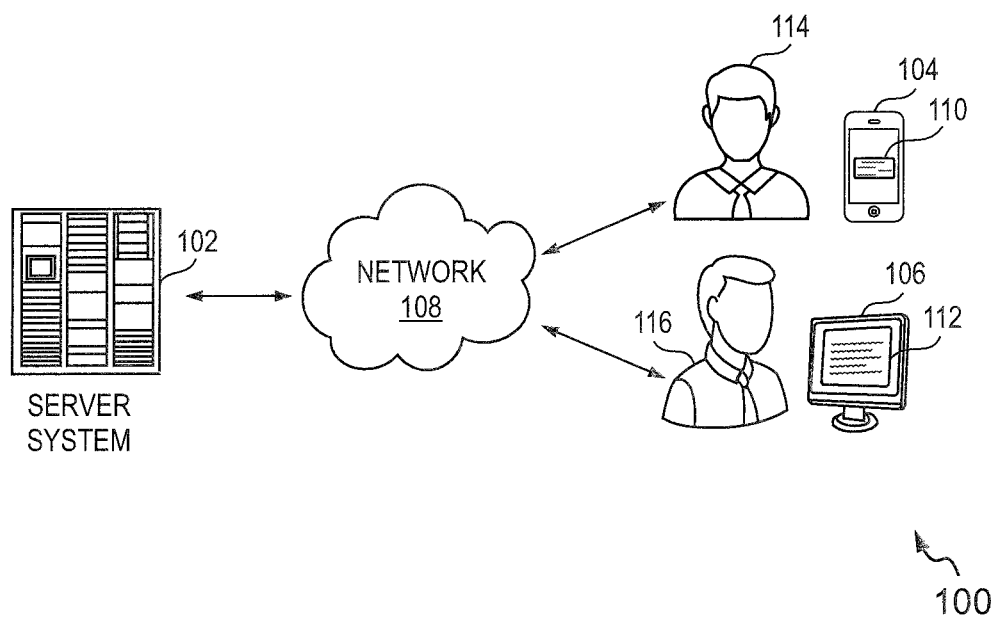
FIG. 1 is an illustration of an example environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for sharing of attributes of a digital document, and, more particularly a digital identity document, by a sharing party (consumer) with one or more relying parties. Some example embodiments of the present disclosure further provide methods and systems for sharing the entire digital document.

The sharing party can store digital copies of his/her identity document (e.g., PAN card, Passport, Driving license, etc.) in a sharing party device, such as a mobile phone, by taking pictures, scanning the document or by downloading soft copy of the document from a remote database. The digital copies of the identity documents of the consumer are stored either in local memory of a sharing party device or in a memory of a document sharing application installed at the sharing party device. The document sharing application can be locked and the application data can be secured by means of biometric security techniques such as, facial recognition, iris scanning or fingerprint recognition. These documents may be needed by one or more relying parties such as but not limited to banks, government agencies, Liquified Petroleum Gas (LPG) connection providers, telephone connection providers, ISPs, airport security, hotels, travel agencies, etc.

A server system manages the document sharing application. The server system facilitates downloading and installation of instances of the application at the sharing party device and at a relying party device of the relying party. The relying party sends an access request in a relying party interface provided by the document sharing application. The access request includes a request to access one or more attributes of a digital document. Herein attributes refer to fields of information associated with the sharing party provided on the digital document. For instance, if the digital document is a PAN card of a consumer (sharing party), the attributes of the PAN card are name of the consumer, date of birth of the consumer and a PAN identifier, among others. The access request further includes a purpose/service for which the attributes are requested and a time period for which the attributes are requested. The server system is responsible for receiving the request initiated at the relying party interface and forwarding it to a sharing party interface of the document sharing application installed at the sharing party device. The sharing party device sends an approval to access (view and endorse) the requested attributes by the relying party to the server system. The approval may include a command to generate a machine-readable encrypted code to encrypt the requested attributes. Based on the command, the server system generates the machine-readable encrypted code to encrypt the requested attributes. The server system further generates a decryption key for the machine-readable encrypted code. Additionally, the server system may mask the attributes other than the requested attributes of the digital document and providing access to the requested attributes to the relying party. Further, the server system facilitates access to the requested attributes to the relying party for a predefined time period.

The server system sends the machine-readable encrypted code and the decryption key to the relying party device. The relying party device retrieves the attributes from the machine-readable encrypted code. The relying party may optionally request for a copy of the digital document for verification. The sharing party interface may send approval for viewing (only viewing) the copy of the digital document by the relying party. The sharing party interface of the document sharing application may enable setting control by the sharing party in accessing the digital document or the attributes of the digital document by the relying party limiting the access to only viewing by the relying party. The relying party endorses the attributes and an endorsement notification is sent to the sharing party interface. The endorsement notification includes endorsement information which are then stored at the sharing party device. The endorsement information, in addition to other things, includes a count of a number of times the requested attributes are endorsed.

In an embodiment, the relying party deletes the attributes of the digital document and endorsement details from the relying party device or a memory of the document sharing application upon expiry of the time period for which the attributes are requested. In another embodiment, the server system is configured to facilitate deletion of the attributes of the digital document and endorsement details from the relying party device or a memory of the document sharing application at the relying party device.

Figure 4:
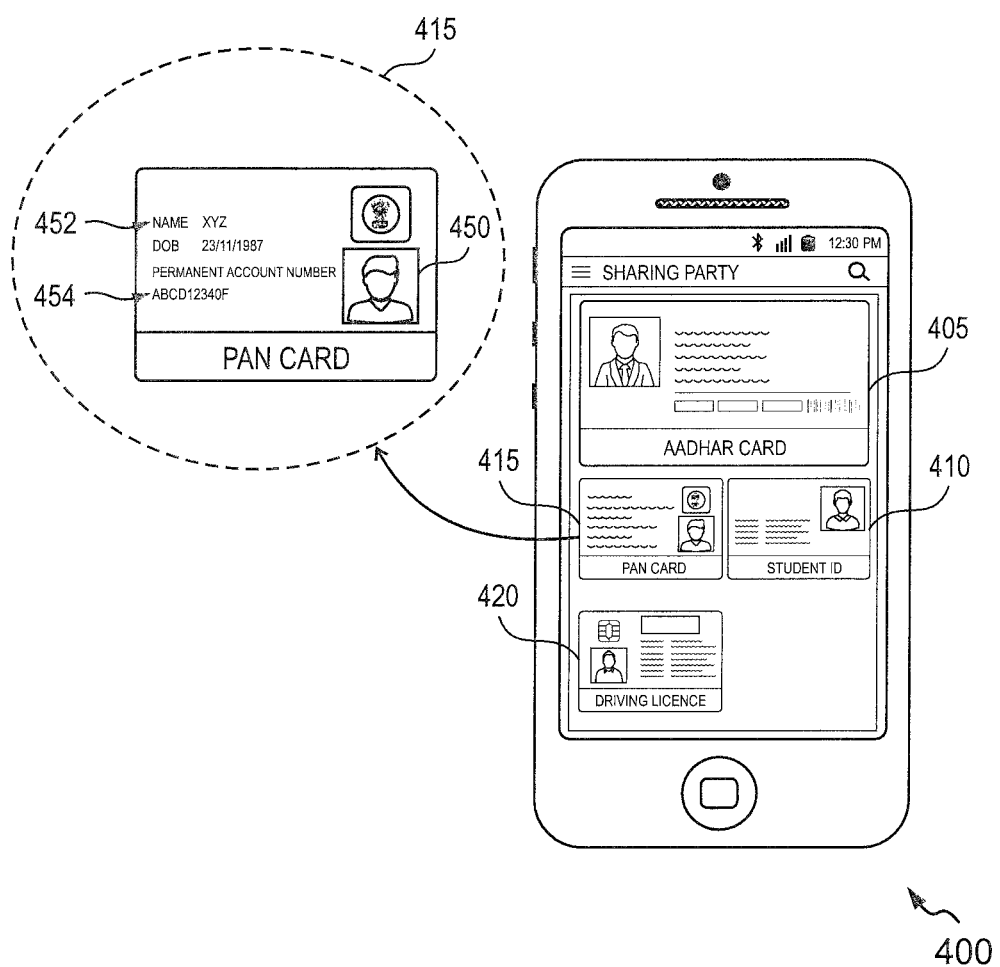
FIG. 4 represents a digital interface of a document sharing application displayed at a sharing party device showing stored digital documents, in accordance with an example embodiment.

FIG. 1 illustrates an exemplary representation of an environment 100, in which at least some example embodiments of the present disclosure can be implemented. In the illustrated environment 100, a server system 102, a sharing party device 104 associated with a sharing party 114 and a relying party device 106 associated with a relying party 116 are shown to be in communication with one another for sharing digital documents or at least one attribute of a digital document by the sharing party 114 with the relying party 116 on request by the relying party 116. The relying party 116 verifies and endorses the at least one attribute of the digital document. It shall be noted that herein the digital document is a digital identity document and examples of a digital identity document include, but are not limited to, a Passport, PAN card, Aadhaar card, college/university issued identity card, voters identity card and a driving license, among other identity documents. Attribute(s) can include one or more sections/fields of information such as an address, a name, date of birth, etc., in the digital identity document. Attributes are illustrated in FIG. 4 (see 450, 452, 454).

It shall further be noted that in some embodiments, the environment 100 can include an additional relying party associated with an additional relying party device (not shown in FIG. 1). The additional relying party may be associated with the relying party 116 and the additional relying party may also seek digital documents or the at least one attribute of the digital document from the sharing party 114 as the relying party 116. The environment 100 may include a plurality of relying parties and relying party devices and a plurality of additional relying parties and additional relying party devices.

The sharing party 114 includes a consumer/user who wishes to avail a service such as opening a bank account, getting a home loan, purchasing a vehicle, etc., where submission and verification of an identity document (digital or paper) of the consumer is mandatory. It must be noted that the terms 'sharing party' and 'consumer' have been used interchangeably throughout the disclosure.

The sharing party 114 can store digital copies of his/her identity documents in a local memory of the sharing party device 104. Further, digital copies of these documents may be stored in a memory of a document sharing application (not shown) installed at the sharing party device 104. Examples of the sharing party device 104 include, but are not limited to, a personal computer (PC), a tablet device, a personal digital assistant (PDA), a smart phone and a laptop. The sharing party device 104 may be provisioned with image capturing modules through which photographs of the identity documents may be taken or scanned and stored in the sharing party device 104. In FIG. 1, the sharing party 114 is depicted as associated with a smartphone (sharing party device 104).

Examples of the relying party 116 include service providers such as a bank, LPG connection providers, telephone connection providers, ISPs, hotels, travel agencies, etc., who wishes to check and verify an identity of the sharing party 114 before providing a service to the sharing party 114. The relying party 116 can operate the relying party device 106 to receive, store and verify the at least one attribute of the digital identity document of the sharing party 114. Examples of the relying party device 106 include, but are not limited to, a personal computer (PC), a tablet device, a personal digital assistant (PDA), a smart phone and a laptop. In FIG. 1, the relying party 116 is depicted as associated with a desktop (relying party device 106). The relying party 116 endorses the at least one attribute shared by the sharing party 114.

Figure 3:
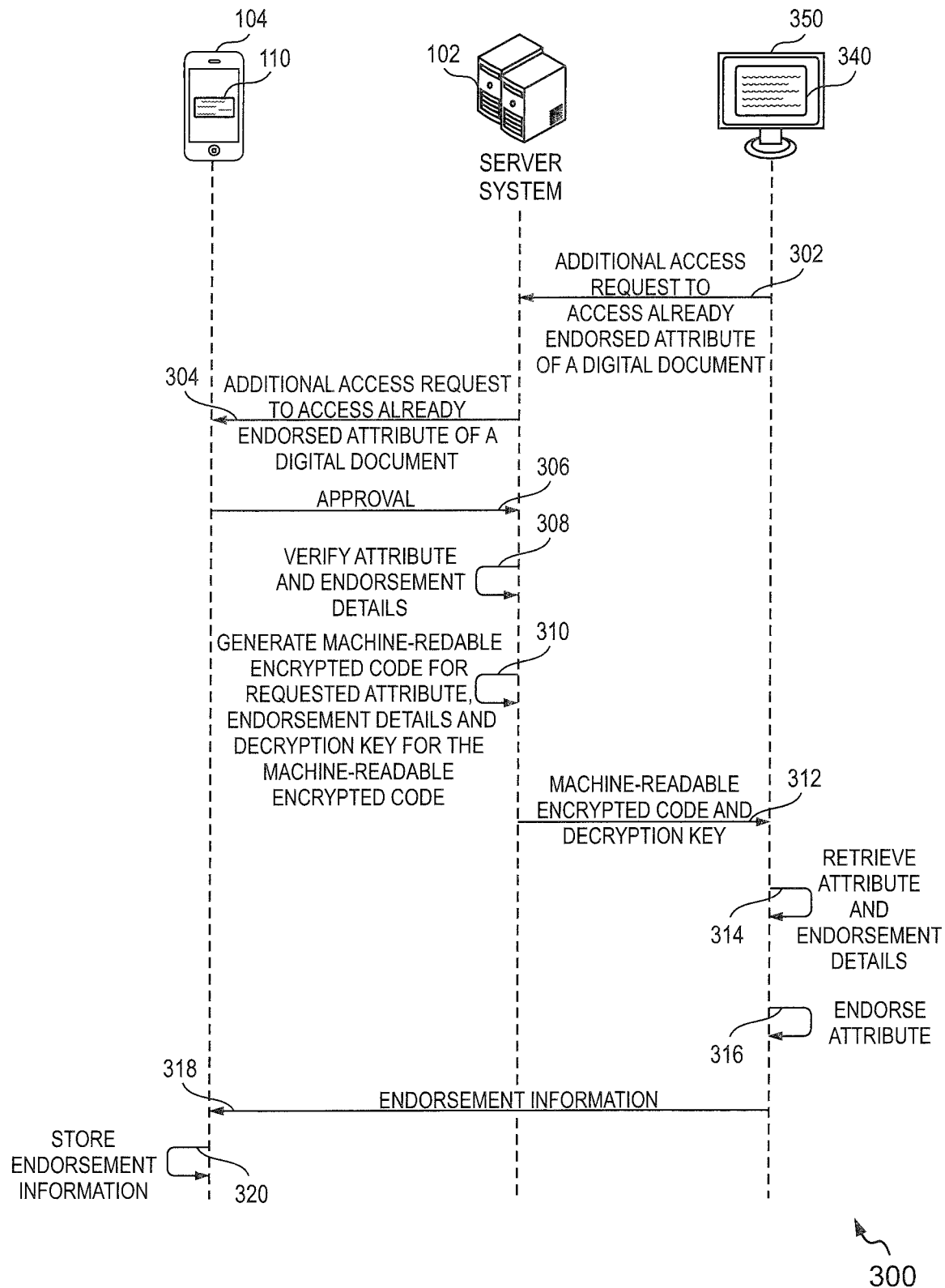
FIG. 3 represents a sequence flow diagram representing sharing of an endorsed attribute of the digital document by the sharing party with an additional relying party, in accordance with an example embodiment.
Figure 9A:
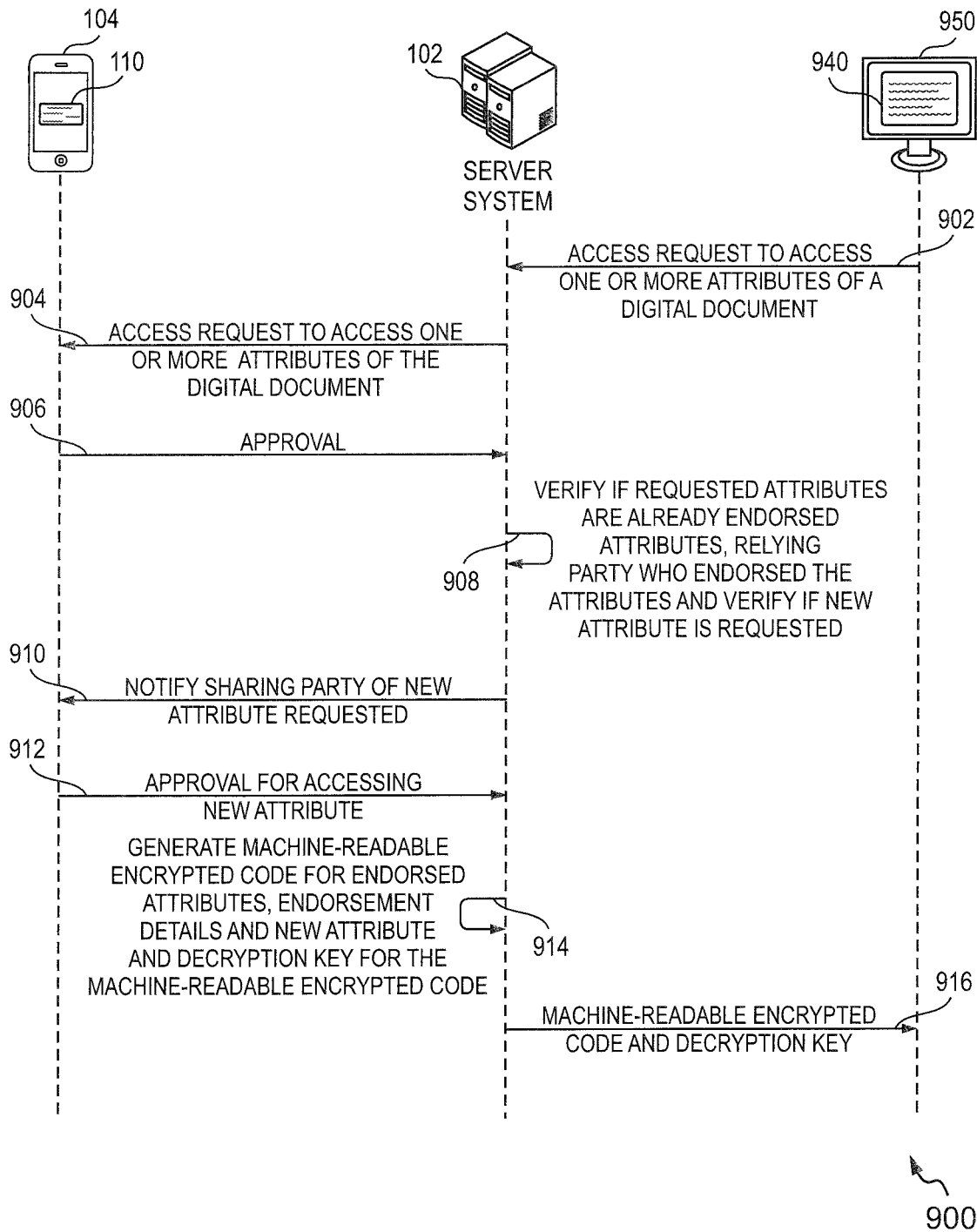
FIGS. 9A and 9B represent a sequence flow diagram representing sharing of new/additional attributes with an additional relying party, in accordance with an example embodiment.
Figure 9B:
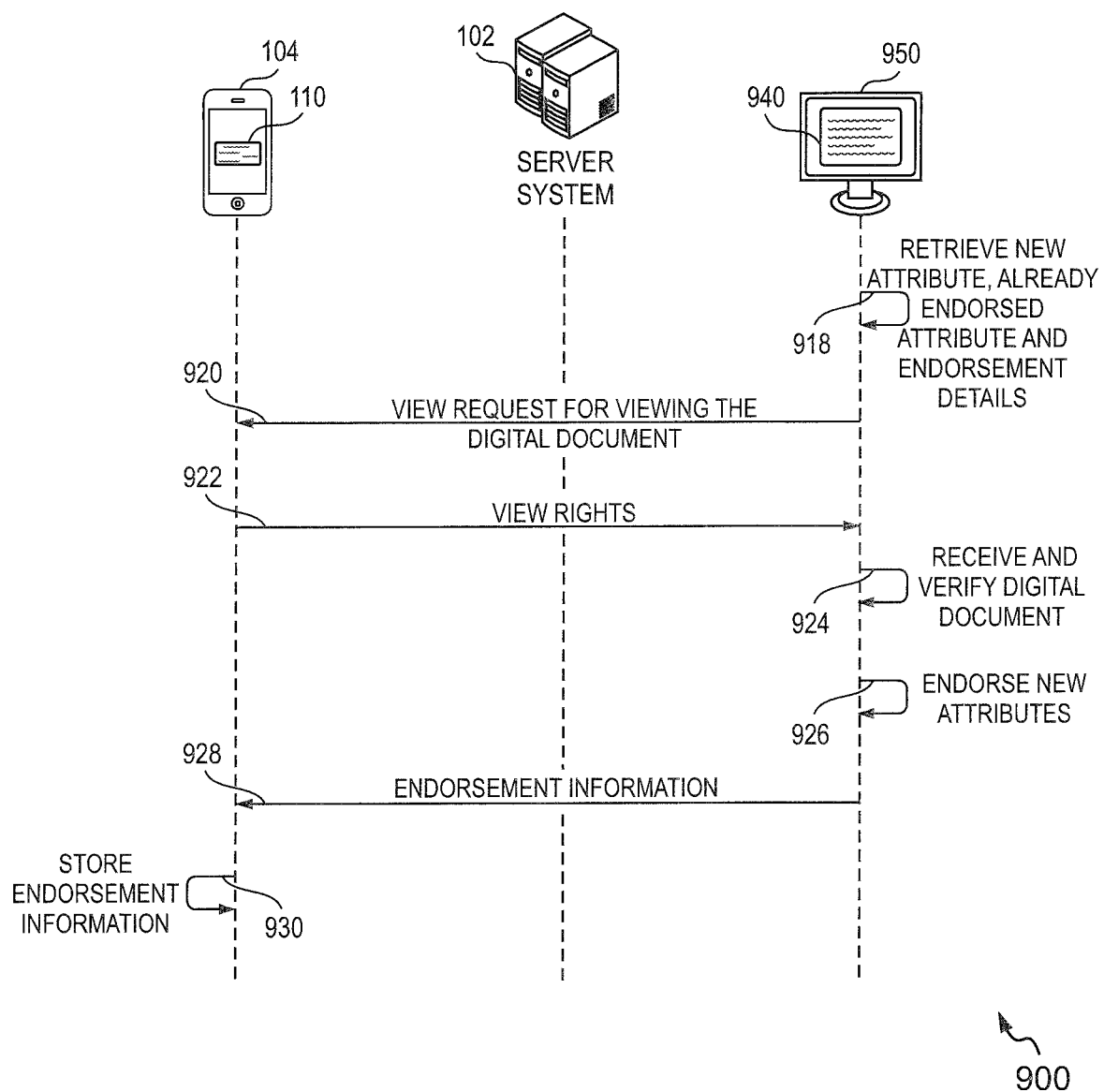

Likewise, examples of the additional relying party also include service providers as mentioned above, payment gateway providers, hotels, etc. who wishes to check and verify an identity of the sharing party 114 before the relying party 116 or the additional relying party provide a service to the sharing party 114. The additional relying party may be associated with the relying party 116. Examples of the additional relying party device (see, 350 in FIG. 3 and 950 in FIGS. 9A-9B) include, but are not limited to, a personal computer (PC), a tablet device, a personal digital assistant (PDA), a smart phone and a laptop. The additional relying party (hereinafter referred to as 'the second relying party') also endorses the at least one attribute or any new attribute of the digital identity document shared by the sharing party 114 with the second relying party. In FIGS. 3, 9A-9B, the additional relying party is depicted as operating a desktop (additional relying party devices 350 and 950).

It shall be noted that sometimes one or more attributes of the identity document may be required for verification by the relying party 116 instead of verifying the entire identity document. As an example, the relying party 116 may be a bank and the relying party 116 may be interested in verifying only the name and address of the sharing party 114. In another example, the relying party 116 may be airport security and the relying party 116 may be interested in verifying only the photo and name of the sharing party 114.

It shall further be noted that, in some scenarios, such as opening a bank account, getting a loan, hotel check-in, etc., the digital identity document or the at least one attribute of the digital identity document may be stored for a longer term by a relying party (such as the relying party 116) as opposed to scenarios such as airport security, travel agencies, railways ticket checking etc., where the digital identity document or the at least one attribute of the digital identity document may not be stored at all by the relying party 116. This disclosure and its various embodiments may not extend to scenarios where a digital identity document or an attribute of the digital identity document is not stored with relying parties (such as the relying party 116) at relying party devices (such as the relying party device 106).

In an example embodiment, the sharing party device 104 and the relying party device 106 are each equipped with an instance of the document sharing application installed therein. It shall be noted that the second relying party device (see, 350 in FIG. 3 and 950 in FIGS. 9A-9B) is also equipped with an instance of the document sharing application installed therein. The document sharing application and its components rest in the server system 102 and the sharing party device 104 can communicate with the server system 102 through the document sharing application installed in the sharing party device 104. In other words, the document sharing application installed on the sharing party device 104 facilitates a sharing party interface 110 to enable communication of the sharing party device 104 with the server system 102. Likewise, the document sharing application installed on the relying party device 106 facilitates a relying party interface 112 to enable communication of the relying party device 106 with the server system 102. The document sharing application is a set of computer executable codes configured to perform the method disclosed herein. The set of computer executable codes may be stored in a non-transitory computer-readable medium of the sharing party device 104. The document sharing application may be a mobile application or a web application. It must be noted that the term 'document sharing application' is interchangeably referred to as 'application' throughout the disclosure.

The document sharing application can be extended as a security API (such as Mastercard security API) in which a sharing party (such as the sharing party 114) and a relying party (such as the relying party 116) need identity information to install the document sharing application or to integrate with API. The server system 102 may be a remote virtual server such as a cloud server. Alternatively, the server system 102 may be a physical server. The server system 102 includes storage devices or memory and one or more processing systems. The memory includes instructions for processing data. The processor executes the instructions stored in the memory and facilitates sharing of digital documents or at least one attribute of a digital document by the sharing party 114 with the relying party 116 in the environment 100.

The sharing party device 104, the relying party device 106 and the server system 102 communicate with one another via a communication network 108. The communication network 108 may be a centralized network or may comprise a plurality of sub-networks that may offer a direct communication or may offer indirect communication between the sharing party device 104, the relying party device 106 and the server system 102. Examples of the communication network 108 include wireless networks, wired networks, and/or combinations thereof. Some non-exhaustive examples of the wireless networks may include wireless local area networks (WLANs), Bluetooth or Zigbee networks, cellular networks and the like. Some non-exhaustive examples of wired networks may include Local Area Networks (LANs), Ethernet, fiber optic networks and the like. An example of a combination of wired networks and wireless networks may include the Internet.

Figure 2:
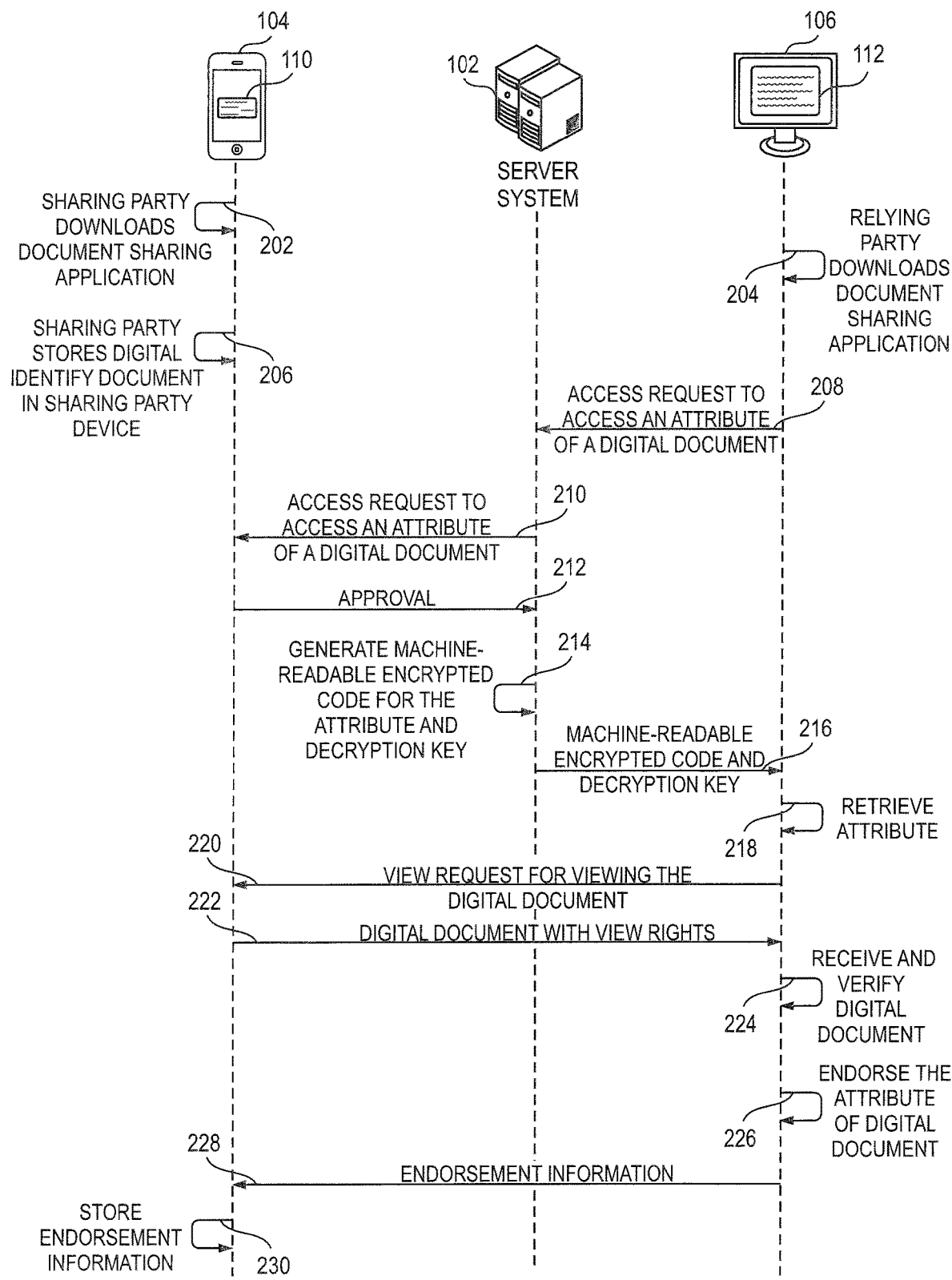
FIG. 2 represents a sequence flow diagram representing sharing of an attribute of a digital document by a sharing party with a relying party for endorsement of the attribute by the relying party, in accordance with an example embodiment.

A non-exhaustive example embodiment of sharing at least one attribute of a digital document by a sharing party such as the sharing party 114 with a relying party such as the relying party 116 is described with reference to FIG. 2. FIG. 2 includes a simplified schematic flow diagram 200 representing a method of sharing at least one attribute of a digital document by a sharing party such as the consumer 114 with a relying party such as the relying party 116, in accordance with an example embodiment. In an example scenario, the consumer 114 has walked into a car dealer facility for purchasing a car. The car dealer is the relying party 116 who may have requested for at least one attribute such as a driving license number of the consumer 114 for assisting the consumer 114 with the purchase.

The consumer 114 may have the document sharing application downloaded and installed at the sharing party device 104. The consumer 114 downloads the document sharing application at any instant substantially in advance to walking into the car dealer facility. Downloading the document sharing application at the sharing party device 104 is performed at operation 202. Similarly, the relying party 116 may have the document sharing application downloaded and installed at the relying party device 106 as shown at operation 204. The relying party 116 downloads the document sharing application at any instant. It shall be noted that the operations 202 and 204 are each a one-time operation. It shall also be noted that, the operations 202 and 204 may occur much ahead of the relying party 116 requesting the sharing party 114 to access an attribute of a digital document of the sharing party 114 and need not necessarily occur in the order as depicted in the flow diagram 200.

It shall further be noted that, the consumer 114 and the relying party 116 may need to log in/sign in to the document sharing application on their respective devices. Logging in can be done with an existing social media account or by creating a new account for the application. Details related to sign in is not explained for the sake of brevity. Once logged in, the sharing party 114 can view the sharing party interface 110 and the relying party 116 can view the relying party interface 112 on their respective devices. The relying party interface 112 provides option to send access request to the consumer 114 request an attribute (e.g., driving license number) and the sharing party interface 110 provides option to share the requested information as per the access request to the relying party 116. The application can be locked and the application data (e.g., photos, scanned documents, etc.) can be secured by means of biometric security techniques such as, facial recognition, iris scanning and fingerprint recognition, among others.

At 206, the consumer 114 stores digital identity documents in the sharing party device 104 or the document sharing application downloaded at operation 202. In an example, the digital identity documents can be stored in a local memory of the sharing party device 104. In this case, the operation 202 need not necessarily occur in the order as depicted in the flow diagram 200, i.e., the digital identity documents may be stored in the memory of the sharing party device 104 much in advance to downloading the application at 202. The consumer 114 can capture photographs of or scan one or more identity documents. Once captured, the digital copies of the one or more identity documents are stored in the local memory of the sharing party device 104.

In an alternate example, the digital identity documents are stored in a memory of the document sharing application downloaded on the sharing party device 104. Opening the document sharing application on the sharing party device 104 after logging in by the sharing party 114 may trigger/initiate a camera application or a scan application. Using the camera or scan application, images of the digital identity documents may be captured and stored in the memory of the document sharing application.

At 208, an access request to access at least one attribute, i.e., the driving license number is received by the server system 102. The access request is initiated at the relying party interface 112 of the document sharing application on the relying party device 106. Apart from the request to access the at least one attribute, the access request also includes a purpose for which the attribute is requested. As an example, the car dealer may need to verify the authenticity and validity of the driving license number. The access request also includes a time period for which the attribute is requested. The time period may be as an example, an hour, a day, a month, two months, a year, etc. At 210, the access request is forwarded to the sharing party interface 110 by the server system 102. The consumer 114 receives the access request as a notification in the sharing party interface 110 of the application.

At 212, the access request is approved by the consumer 114 and an approval is sent to the server system 102 from the sharing party interface 110 of the application. Herein, approval may include a command/request to generate a machine-readable encrypted code to encrypt the requested attribute, i.e. the driving license number. It shall be noted that, approval may include approval to only view and endorse the requested attribute by the relying party 116. The sharing party interface 110 may enable initiating the command/request for generating the machine-readable encrypted code. Examples of the machine-readable encrypted code include a bar code, a QR code or the likes, in an example embodiment. In another example embodiment, the machine-readable encrypted code can be a blockchain hash or a hash.

In another embodiment, the approval may include a command/request to mask attributes other than the requested attribute of the digital document and provide access to or display the requested attribute (i.e. the driving license number) to the relying party 116. The server system 102 may not provide access to the attributes other than the requested attribute. Masking may be performed using various techniques including substitution of sensitive/irrelevant data with random values and characters or simply overlaying an opaque layer of display over the attributes to be masked. Additionally, masking may be performed using various image processing, image editing and document editing tools already known in the art. It shall be noted that, approval may include approval to only view and endorse the requested attribute by the relying party 116.

It shall be noted that server system 102 may facilitate access to the requested attribute of the digital document to the relying party 116 for a pre-defined time period same as the time period included in the access request. The pre-defined time period is the time period for which the attribute is requested by the relying party 116. Examples of the pre-defined time period may include an hour, a day, a month, two months, a year, etc.

At 214, the server system 102 generates the machine-readable encrypted code to encrypt the requested attribute, based on the command/request initiated at the sharing party interface 110. The machine-readable encrypted code can include the attribute and a time period till which the relying party 116 will have access to the attribute. For the purposes of this disclosure, the machine-readable encrypted code is assumed to be a QR code. The server system 102 further generates a decryption key for the machine-readable encrypted code. The machine-readable encrypted code may be viewed by the consumer 114 at the sharing party interface 110 after generation by the server system 102. While generating the machine-readable code the server system 102 facilitates provision of control to allow only viewing and endorsement of the at least one attribute solely by the relying party 116 upon retrieval of the at least one attribute by decrypting the machine-readable encrypted code by the relying party 116.

At 216, the server system 102 sends the machine-readable encrypted code and the decryption key to the relying party device 106/relying party interface 112. The machine-readable encrypted code and the decryption key may be received as notification at the relying party interface 112 of the application. In an example embodiment, the machine-readable encrypted code and the decryption key may be sent separately and separate notifications may be received for each. At 218, the relying party device 106 or the relying party interface 112 of the application retrieves the attribute from the machine-readable encrypted code using the decryption key.

At 220, a view request may be optionally sent from the relying party device 106 for viewing a digital copy of the original identity document associated with the attribute among a plurality of original digital documents stored in the sharing party device 104. The relying party device 106 may initiate and send the view request for verification of the authenticity of the digital document and the associated attribute. It shall be noted that the view request may be sent only on specific occasions such as when the attribute from the digital document is being received for the first time. Next time, when the same attribute is requested by the relying party 116 or a second relying party, the view request may not be sent.

At 222, the digital document may be sent from the sharing party device 104 to the relying party 116 by setting view rights to the digital document to control or limit the access to the digital document to only viewing solely by the relying party 116. The sharing party interface 110 of the application may enable setting such controls by the sharing party/consumer 114.

At 224, the relying party device 106/relying party interface 112 receives and verifies the digital document. For verifying the authenticity of the digital document, the relying party 116 may communicate with a server managed by the respective authority issuing the digital document to the consumer 114. For example, if the digital document is a driving license, the relying party 116 may communicate with a server managed by the Regional Transport Office (RTO) of the state in India issuing the driving license to the consumer 114. Likewise, if the digital document if a pan card, the relying party 116 may communicate with a server managed by the Income Tax department.

At 226, the relying party 116 endorses the attribute in the relying party interface 112. Herein, endorsement may include attestation and verification of the attribute and the digital document by the relying party 116.

Figure 8:
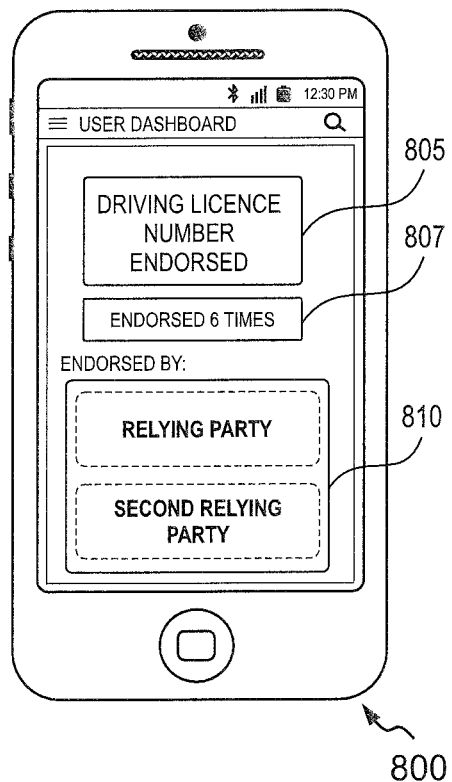
FIG. 8 represents a sharing party interface of the document sharing application displayed at the sharing party device showing reception of endorsement notification by the sharing party, in accordance with an example embodiment.

At 228, endorsement information is sent through the server system 102 from the relying party interface 112 to the sharing party interface 110. The endorsement information may include an endorsement message of endorsement of the at least one attribute. The endorsement information also includes an identification of the relying party 116 that has endorsed the attribute. The endorsement information further includes a count of number of times the requested attribute is endorsed as can be seen in FIG. 8.

At 230, the endorsement information is stored in the local memory of the sharing party device 104 or a memory of the document sharing application downloaded on the sharing party device 104. Similarly, the attribute and the endorsement information may also be stored in the local memory of the relying party device 106 or a memory of the document sharing application downloaded on the relying party device 106.

Often one or more second relying parties may also request for the attribute of the digital document of the sharing party 114 for verification and endorsement. Referring to the previous example scenario where the consumer 114 (the sharing party 114) is at a car dealer facility for purchasing a car, the consumer 114 may also have expressed an interest in availing a car loan for purchasing the car. The car dealer is the relying party 116 who may have already verified and endorsed an attribute (i.e. driving license) for selling the car to the consumer 114. The relying party 116 may be associated with various financing companies/banks who may be interested in providing a car loan to the consumer 114 for purchasing the car. One such car financing company is a second relying party. The second relying party also requests for the same attribute i.e., the driving license of the consumer 114, which the relying party 116 has already endorsed and has been already explained with reference to FIG. 2.

FIG. 3 includes a simplified schematic flow diagram 300 representing a method of sharing of the already endorsed attribute of the digital document by the sharing party 114 with the second relying party, in accordance with an example embodiment. At 302, an additional access request to access the already endorsed attribute i.e., driving license is received by the server system 102. The additional access request is initiated at a second relying party interface 340 of the document sharing application on a second relying party device 350. The additional access request is an example of the access request explained with reference to FIG. 2.

At 304, the additional access request is forwarded to the sharing party interface 110 by the server system 102. The consumer 114 receives the additional access request as a notification in the sharing party interface 110 of the application. Apart from the request to access the at least one attribute, the additional access request also includes a purpose for which the attribute is requested.

At 306, the additional access request is approved by the consumer 114 and an approval is sent to the server system 102 in the application. The approval is explained with respect to FIG. 2. At 308, the server system 102 verifies the requested attribute and the endorsement details of the requested attribute. This operation is performed to determine whether the requested attribute has already been verified by a relying party (such as the relying party 116).

At 310, the server system 102 generates a machine-readable encrypted code for the requested attribute and the endorsement details of the requested attribute. The machine-readable encrypted code can also include the time period till which the second relying party will have access to the attribute. The server system 102 further generates a decryption key for the machine-readable encrypted code. While generating the machine-readable code the server system 102 facilitates provision of control to allow only viewing and endorsement of the at least one attribute solely by the second relying party.

In another embodiment as described earlier, the server system 102 may mask the attributes other than the requested attribute of the digital document and provide access to or display the requested attribute (i.e. the driving license number) to the relying party 116. The server system 102 does not provide access to the attributes other than the requested attribute. The server system 102 may further facilitate access to the requested attribute of the digital document to the relying party 116 for a pre-defined time period same as the time period included in the access request.

At 312, the server system 102 sends the machine-readable encrypted code and the decryption key to the second relying party device 350. Alternatively, the server system 102 may send the masked digital document to the second relying party device 350. The machine-readable encrypted code and the decryption key may be received as notification at the second relying party interface 340 of the application. At 314, the second relying party device 350/the second relying party interface 340 retrieves the attribute and the endorsement details from the machine-readable encrypted code using the decryption key. At 316, the second relying party endorses the attribute in the second relying party interface 340. Herein, endorsement may include attestation and verification of the already endorsed attribute for a second time by the second relying party.

At 318, endorsement information is sent through the server system 102 from the second relying party interface 340 to the sharing party interface 110. The endorsement information may include an endorsement message of endorsement of the requested attribute by the second relying party. The endorsement information can further include an identification of the second relying party who has endorsed the attribute. The endorsement information further includes a count of number of times the requested attribute is endorsed as can be seen in FIG. 8.

At 320, the endorsement information is stored in the local memory of the sharing party device 104 or a memory of the document sharing application downloaded on the sharing party device 104. Similarly, the attribute and the endorsement information may also be stored in the local memory of the second relying party device 350 or a memory of the document sharing application downloaded on the second relying party device 350.

FIG. 4 is an example representation of a digital interface 400 of the sharing party device 104. The digital interface 400 shows a plurality of digital documents associated with the sharing party 114 (the consumer 114). The plurality of digital documents are digital identity documents issued by one or more authorities (government bodies/schools/universities, etc.) to the sharing party 114. As seen in FIG. 4, the digital interface 400 displays a digital copy of an Aadhaar card 405, a digital copy of a PAN card 415, a digital copy of a college/school/university issued identity card 410 and a digital copy of a driving license 420.

As seen in FIG. 4 an enhanced display of the digital identity document 415 illustrates example attributes 450, 452 and 454 of the digital identity document 415. The digital identity document 415 is a PAN card of a sharing party (such as the sharing party/consumer 114). Attribute 450 is a photo of the sharing party 114, attribute 452 is a name of the sharing party 114 and attribute 454 is the PAN of the sharing party 114. It shall be noted that all fields of information provided in a digital identity document (e.g., 405, 410, 415, 420) are each an attribute of the digital identity document that identities and authenticates the sharing party 114 holding that identity document.

It has been already described that the sharing party device 104 is provisioned with image capturing modules using which photographs of identity documents can be captured or scanned and stored in the sharing party device 104. The digital copies (photographs/scanned copies) of the identity documents may be stored in the local internal memory/storage of the sharing party device 104. Alternatively, or additionally, the digital copies (photographs/scanned copies) of the identity documents may be stored in the memory of the document sharing application installed on the sharing party device 104. Further, digital copies (soft copies) of the identity documents can be downloaded from a remote database managed by an issuing authority or government body such as, Regional Transport Office (RTO), Income Tax department, etc.

Figure 5:
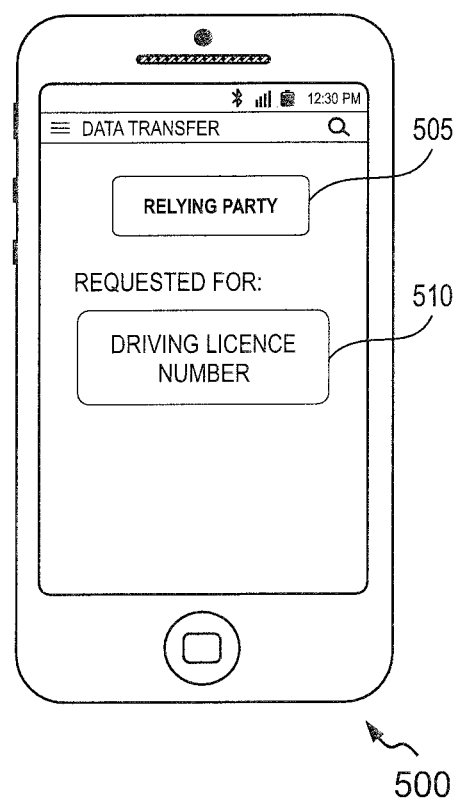
FIG. 5 represents a sharing party interface of the document sharing application displayed at the sharing party device showing an access request comprising request to access two attributes of a digital document, in accordance with an example embodiment.

FIG. 5 is an example representation of a sharing party interface 500 of the document sharing application on the sharing party device 104. The interface 500 displays a relying party field 505 and an access request field 510. The relying party field 505 may display the name of the relying party 116/second relying party who may have sent the access request (or additional access request) to access at least one attribute of a digital document of the consumer 114 operating the sharing party device 104. Referring to the example used to explain the flow diagrams 200 and 300, the relying party field 505 may display the names of the car dealer or the financial institute. The access request field 510 includes a request to access an attribute (e.g., driving license number) of a digital document (e.g., driving license).

Figure 6A:
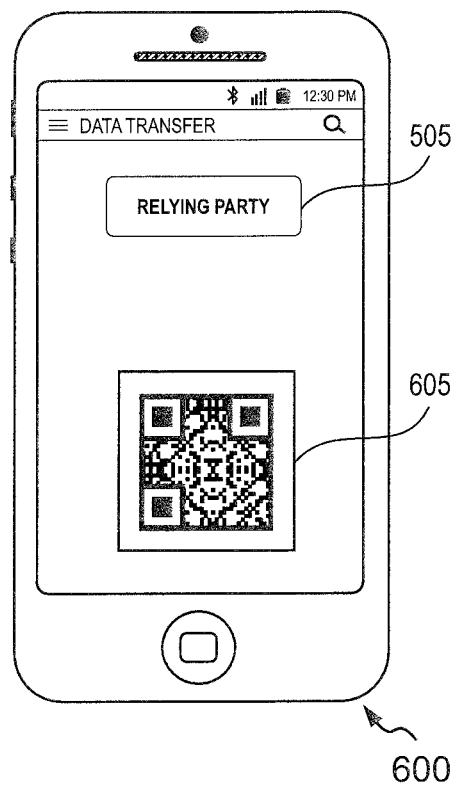
FIG. 6A represents a sharing party interface of the document sharing application displayed at the sharing party device showing generation of a machine-readable encrypted code (QR code), in accordance with an example embodiment.

FIG. 6A is an example representation of a sharing party interface 600 of the document sharing application on the sharing party device 104. The interface 600 displays the relying party field 505 explained with reference to FIG. 5 and a machine-readable encrypted code 605. As already explained upon approval of the access request by the sharing party 114, a machine-readable encrypted code is generated by the server system 102. The machine-readable encrypted code generated by the server system 102 is displayed at the sharing party interface 110 of the application managed by the server system 102. The machine-readable encrypted code 605 displayed at the sharing party interface 600 is a QR code, as an example. In some examples, the machine-readable encrypted code 605 may be a blockchain hash or a hash.

Figure 6B:
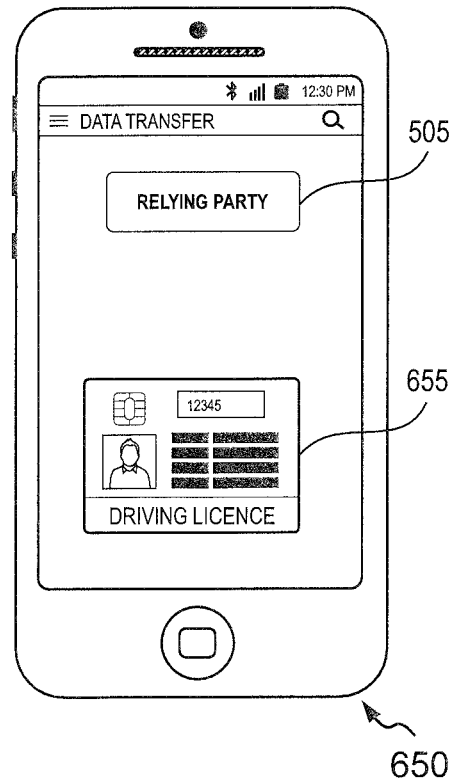
FIG. 6B represents a sharing party interface of the document sharing application displayed at the sharing party device showing masking of attributes other than a requested attribute, in accordance with an example embodiment.

FIG. 6B is another example representation of a sharing party interface 650 of the document sharing application on the sharing party device 104. The interface 650 displays the relying party field 505 explained with reference to FIG. 5 and a digital identity document 655, a masked digital identity document of one of the example digital identity documents among 405, 410, 415, 420 as seen in FIG. 4. As already explained upon approval of the access request by the sharing party 114, attributes other than the requested attribute are masked such that only the requested attribute can be accessed by the relying party 116 and the masked attributes are not accessible or visible. The masked document generated by the server system 102 is displayed at the sharing party interface 110 of the application managed by the server system 102. Masking may be performed using various conventional techniques including substitution of sensitive/irrelevant data with random values and characters, or deleting or blurring the corresponding data upon display. Additionally, masking may be performed using various image processing, image editing and document editing tools already known in the art.

Figure 7:
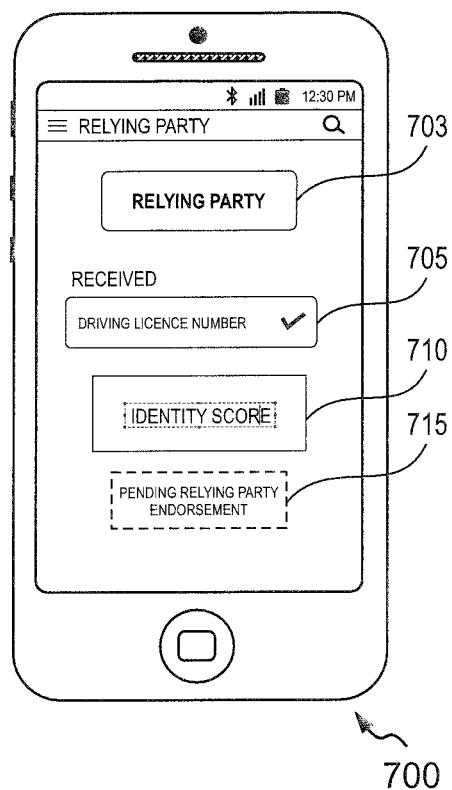
FIG. 7 represents a relying party interface of the document sharing application displayed at a relying party device showing reception of requested attributes by the relying party, in accordance with an embodiment.

FIG. 7 is an example representation of a relying party interface 700 (or the second relying party interface 340) of the document sharing application on the relying party device 106 (or the second relying party device 350). The interface 700 displays a relying party field 703, which is similar to the relying party field 505, explained with reference to FIG. 5. The interface 700 also displays an attribute received field 705, an identity score field 710 and an endorsement status field 715. The attribute received field 705 displays a text that says that the attribute (e.g., driving license number) has been received from the sharing party device 104. The identity score field 710 displays a score upon verification of authenticity of the attribute (e.g., driving license number) and the digital document (e.g., driving license). As an example, the identity score may be represented by numbers 0 and 1. The identity score may be 0 if the attribute is not found to be authentic and the identity score may be 1 if the attribute is found to be authentic. Depending upon whether the attribute is authentic, the relying party 116 may endorse the attribute. A status of endorsement may be displayed in the endorsement status field 715. The status, as an example, may appear as 'endorsement pending by the relying party' 'endorsement completed by the relying party' etc.

FIG. 8 is an example representation of a sharing party interface 800 of the document sharing application on the sharing party device 104. The interface 800 displays an endorsement message field 805 displaying a text message indicating that an attribute has been endorsed by the relying party 116 and/or the second relying party. The interface 800 displays a count field 807 displaying a count of the number of times the attribute has been endorsed (e.g. Endorsed 6 times) by the relying party 116 and/or the second relying party. The interface 800 displays an identification field 810 which includes the identification of the relying party 116 and/or the second relying party who have endorsed the attribute (e.g., endorsed by the relying party 116 or the second relying party).

Often a second relying party may require new/additional attribute along with an already endorsed attribute from a digital document of the sharing party 114 for verification and endorsement. Referring again to the previous example scenario where the consumer 114 (the sharing party 114) has walked into a car dealer facility for purchasing a car and expressed an interest in availing a car loan for purchasing the car, the second relying party i.e., the financial institution providing the loan may request for a new/additional attribute e.g., an age proof of the consumer 114 along with the already endorsed attribute i.e. the driving license number.

FIGS. 9A and 9B illustrate a simplified schematic flow diagram 900 representing a method of sharing of a new/additional attribute of the digital document by the sharing party 114 with the second relying party, in accordance with an example embodiment. At 902, an access request to access one or more attributes (i.e. an age proof and a driving license number) is received by the server system 102. The access request referred to at 902 may be the additional access request explained with reference to FIG. 3 and flow diagram 300. The access request may be initiated at a second relying party interface 940 (such as the second relying party interface 340) of the document sharing application on a second relying party device 950 (such as the second relying party device 350). Apart from the request to access a new attribute, an already endorsed attribute and endorsement details of the already endorsed attribute, the access request also includes a purpose for which the attribute is requested and a time period for which the attribute is requested.

At 904, the access request is forwarded to the sharing party interface 110 by the server system 102. The consumer 114 receives the access request as a notification in the sharing party interface 110 of the application.

At 906, the access request is approved by the consumer 114 and an approval is sent to the server system 102 in the application. The approval is an approval for checking if the requested one or more attributes include already endorsed attribute(s) and new attribute(s).

At 908, the server system 102 verifies if the requested attribute is already endorsed. At the same operation, the server system 102 also verifies the relying party 116 who endorsed the attributes. The server system 102 further verifies if a new attribute is requested for access at the same operation (i.e., 908). At 910, the server system 102, sends a notification of a request for accessing a new attribute by the second relying party to the sharing party interface 110.

At 912, the request for accessing the new attribute is approved by the consumer 114 and an approval for accessing the new attribute is sent to the server system 102 in the application. Herein, the approval for accessing the new attribute may include a command/request to generate a machine-readable encrypted code to encrypt the requested attributes. Further, the approval may include a command/request to mask the attributes other than the requested attribute of the digital document. The approval may further be an approval to access the new attribute, the already endorsed attribute and the endorsement details of the already endorsed attribute for viewing and endorsement solely by the second relying party.

At 914, the server system 102 generates a machine-readable encrypted code for the requested new attribute, the endorsed attribute and the endorsement details of the endorsed attribute. The machine-readable encrypted code can also include the time period till which the second relying party will have access to the new attribute, the endorsed attribute and the endorsement details. While generating the machine-readable code, the server system 102 facilitates provision of control to allow only viewing and endorsement of the at least one attribute solely by the second relying party. The server system 102 further generates a decryption key for the machine-readable encrypted code. In another embodiment, the server system 102 masks the attributes other than the requested attributes of the digital document.

It shall be noted that server system 102 may facilitate access to the requested attribute of the digital document to the relying party 116 for a pre-defined time period same as the time period included in the access request.

At 916, the server system 102 sends the machine-readable encrypted code and the decryption key or the masked document to the second relying party device 950. At 918, the second relying party device 950 or the second relying party interface 940 of the application retrieves the new attribute, the already endorsed attribute and the endorsement details of the already endorsed attribute from the machine-readable encrypted code using the decryption key.

At 920, the second relying party device 950 may be used to send a view request for viewing a digital copy of the original identity document from which the attribute is sent among a plurality of original identity documents stored in the sharing party device 104. It shall be noted that view request may be sent from the second relying party device 950 only on specific occasions such as when the attribute from the digital document is being received for the first time.

At 922, the consumer may send the digital document to the second relying party device 950 by setting view rights to control or limit the access to the digital document to ensure viewing only by the second relying party. The sharing party interface 110 of the application may enable setting such controls by the sharing party/consumer 114.

At 924, the second relying party interface 940 receives and verifies the digital document. For verifying the authenticity of the digital document, the second relying party may communicate with a server managed by the respective authority issuing the digital document to the consumer 114.

At 926, the second relying party endorses the new attribute. At 928, endorsement information is sent through the server system 102 from the second relying party interface 940 to the sharing party interface 110. The endorsement information may include an endorsement message and an identification of the second relying party that has endorsed the attribute. The endorsement information further includes a count of number of times the requested attribute is endorsed.

At 930, the endorsement information is stored in the local memory of the sharing party device 104 or a memory of the document sharing application downloaded on the sharing party device 104. The endorsement information may also be stored in the second relying party device 950.

Similarly, even a relying party (such as the relying party 116) may request for new/additional attribute(s) from an already viewed and verified digital identity document (e.g., driving license) of the sharing party 114 for verification and endorsement. Referring again to the previous example scenario where the consumer 114 (the sharing party 114) has walked into a car dealer facility for purchasing a car, the relying party 116 i.e. the car dealer who has already endorsed the driving license number of the consumer 114 may further request for a new attribute e.g., an age proof of the consumer 114 from the same digital identity document i.e. the driving license. It shall be noted that the server system 102 is configured to encrypt and send information corresponding to previously endorsed attribute(s) such that the relying party 116 has proper information on which attributes have been already endorsed and which attributes are yet to be endorsed and whether the requested attribute has already been endorsed.

Figure 10:
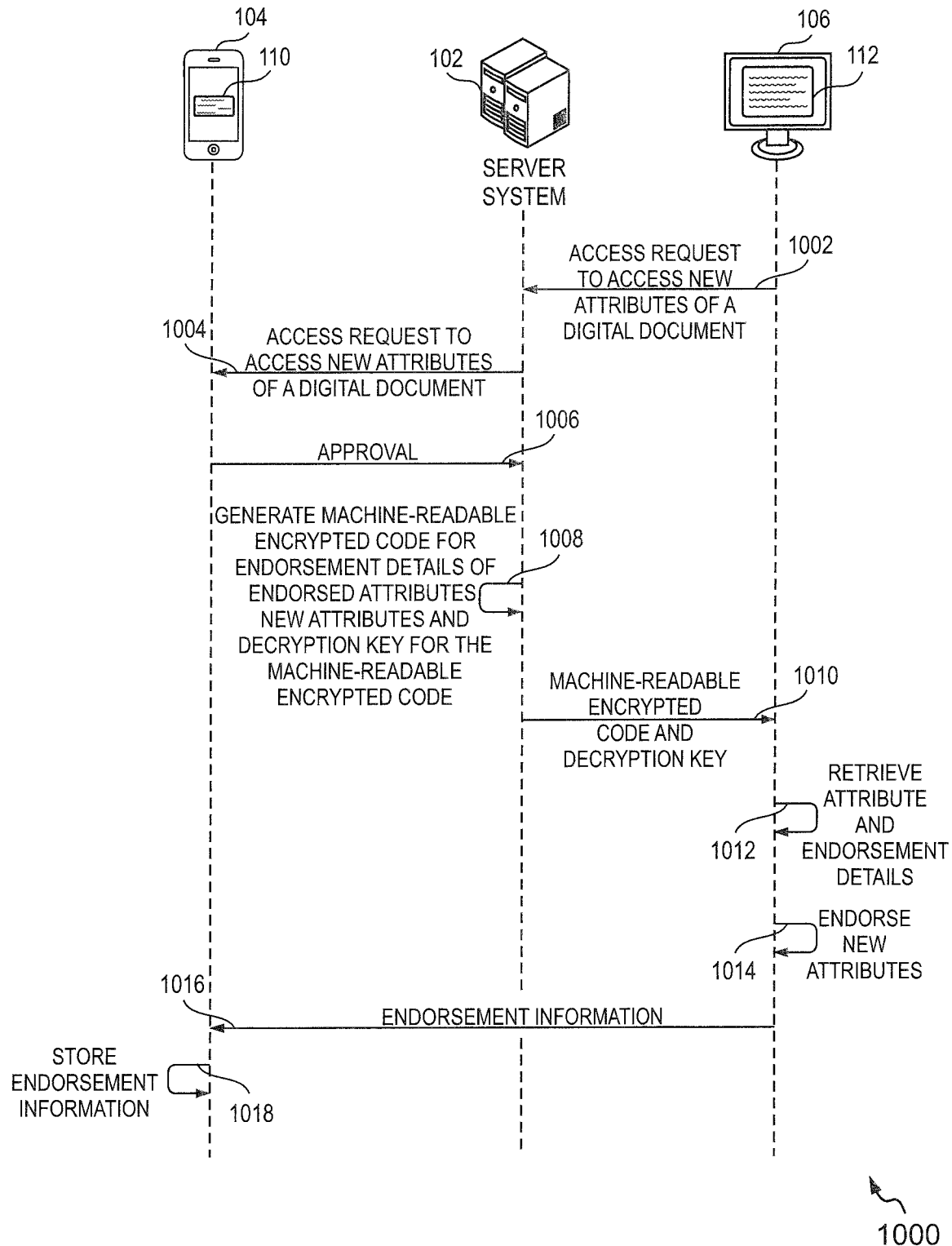
FIG. 10 represents a sequence flow diagram representing sharing of new/additional attributes with a first relying party, in accordance with an example embodiment.

FIG. 10 illustrates a simplified sequence flow diagram 1000 representing a method of sharing of a new/additional attribute of the digital document by the sharing party 114 with the relying party 116, in accordance with an example embodiment. It shall be noted that the digital identity document from which the new attribute is requested is already verified by the relying party 116 and is explained with reference to FIG. 2.

At 1002, an access request to access a new attribute (i.e. an age proof) is received by the server system 102. Apart from the request to access the attribute, the access request also includes a purpose for which the attribute is requested and a time period for which the attribute is requested. At 1004, the access request is forwarded to the sharing party interface 110 by the server system 102. At 1006, the access request is approved by the consumer 114 and an approval is sent to the server system 102 in the application. The approval is explained with reference to FIGS. 2, 3 and 9A-9B (see 912). At 1008, the server system 102 generates a machine-readable encrypted code for the requested new attribute or masks the attributes other than the requested new attribute of the digital document. The server system 102 may also encrypt the already endorsed attribute and the endorsement details of the already endorsed attribute (such as count of endorsement). The machine-readable encrypted code also includes the time period till which the relying party 116 will have access to the new attribute. The server system 102 further generates a decryption key for the machine-readable encrypted code.

At 1010, the server system 102 sends the machine-readable encrypted code and the decryption key to the relying party device 106. At 1012, the relying party device 106 or the relying party interface 112 of the application retrieves the new attribute. The relying party 116 also retrieves the already endorsed attribute and the endorsement details from the machine-readable encrypted code using the decryption key. Based on the retrieved information, the relying party 116 knows which attributes are already endorsed and which attributes are to be endorsed and whether the new attribute (requested attribute) has been already endorsed.

At 1014, the relying party 116 endorses the new attribute if the new attribute is not already endorsed using the relying party device 106 in the relying party interface 112. At 1016, endorsement information comprising an endorsement message and identification of the relying party 116 is sent through the server system 102 from the relying party interface 112 to the sharing party interface 110. At 1018, the endorsement information is stored in the local memory of the sharing party device 104 or a memory of the document sharing application downloaded on the sharing party device 104. The endorsement information may also be stored in the relying party device 106.

Figure 11:
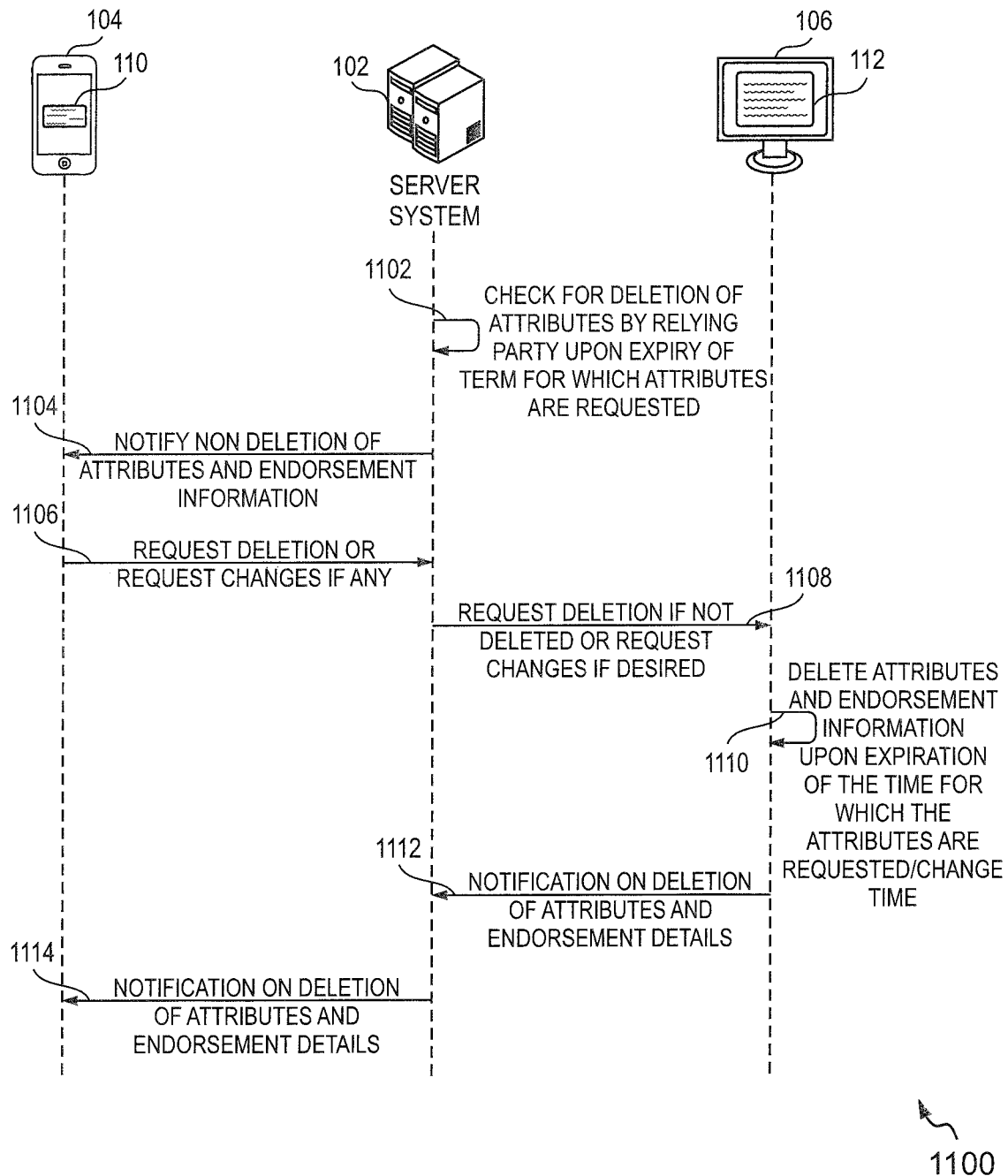
FIG. 11 represents a sequence flow diagram representing deletion of attributes of the digital document by relying parties, in accordance with an example embodiment.

The relying party 116 and the second relying party are required to delete the attribute and the endorsement information upon expiry of the time period for which attributes are requested by the relying party 116 and the second relying party. The server system 102 facilitates deletion of attributes and endorsement details, if any, from storages of the relying party device 106 and second relying party devices. FIG. 11 represents a sequence flow diagram 1100 representing one example method of deletion of attributes of the digital document by a relying party (such as the relying party 116), in accordance with an example embodiment. In FIG. 11, the deletion of attributes and endorsement details are shown only for the relying party 116 for the purpose of explanation. Similar steps may be followed for the second relying party.

At 1102, the server system 102 checks whether attributes shared by a sharing party 114 and endorsement information have been deleted by the relying party 116 upon expiry of the time period for which the attributes were requested by the relying party 116. It shall be noted that, the attributes shared by the sharing party 114 explained with reference to the FIGS. 2-10 are required to be deleted upon expiry of a time period as instructed in the machine-readable encrypted code. The attributes received from the sharing party 114 and the endorsement details associated with the attributes are stored at the relying party device 106 in a device memory or a memory of the document sharing application downloaded on the relying party device 106.

At 1104, the server system 102 notifies the sharing party 114 of non-deletion of the attributes and endorsement information, if the server system 102 determines at the previous operation (operation 1102) that the relying party 116 has not deleted the attributes and endorsement details upon expiry of the time period for which the attributes were requested by the relying party 116. The notification may be received at the sharing party interface 110.

At 1106, at least one of a delete request and a change request may be initiated at the sharing party interface 110 and sent to the server system 102. The delete request may be initiated at the sharing party interface 110 if the sharing party 114 wants the relying party 116 to immediately remove or erase the attributes and endorsement details from the relying party device 106. Unlike the delete request, the change request may be initiated to instruct the relying party 116 to apply certain changes to the time period and the attributes and endorsement information. The instruction is encoded in the change request. Examples of change include extension of the time period.

At 1108, the server system 102 forwards the delete request or the change request to the relying party interface 112. At 1110, the server system 102 deletes the attributes and the endorsement information or applies changes to the time period based on whether the sharing party 114 has sent the delete request or the change request. At 1112, a delete or change notification comprising details of deletion or application of changes is sent through the server system 102 from the relying party interface 112 to the sharing party interface 110.

Another example method of deletion of attributes and endorsement details is explained below. The sequence flow, however, for this method is not shown. The operations performed at the server system 102 may be bypassed in this method. The relying party 116 deletes the attributes and endorsement details upon expiry of the time period as instructed in the machine-readable encrypted code. Upon deletion, the sharing party 114 may be notified of the deletion.

Figure 12:
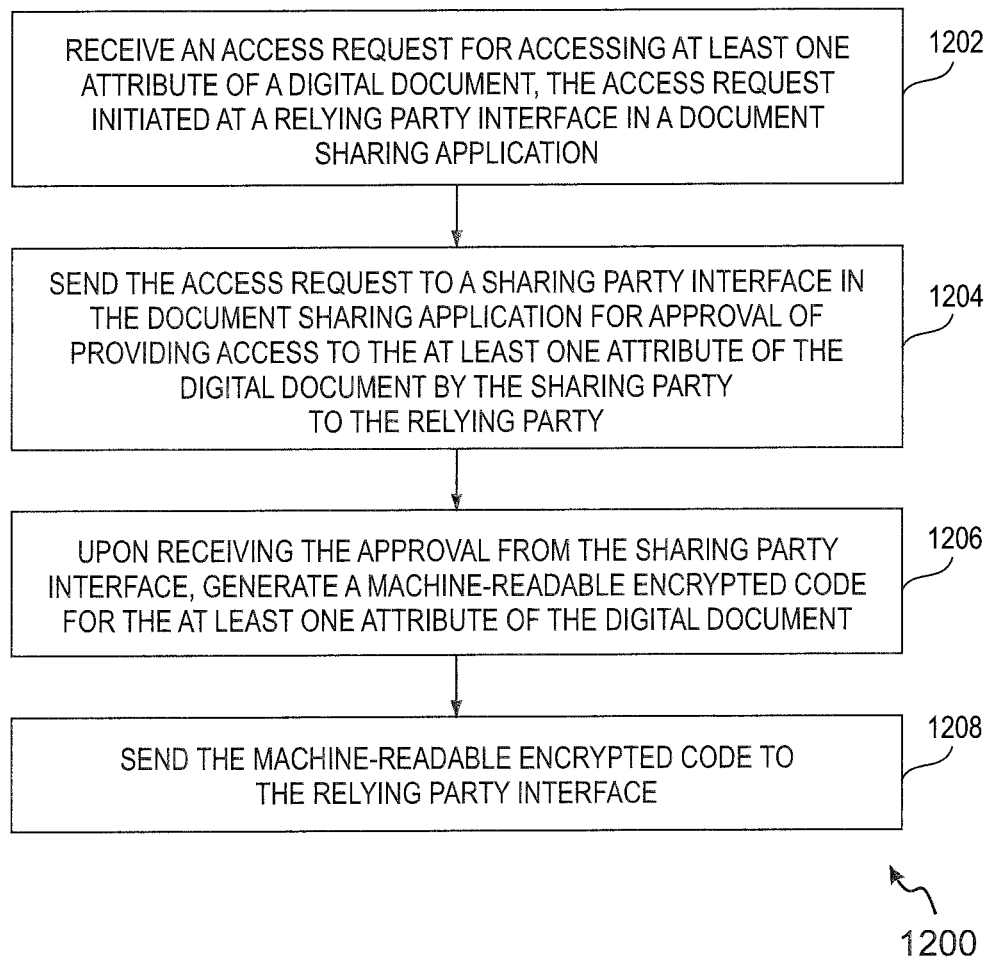
FIG. 12 illustrates a flow diagram of a method of sharing of attributes of a digital document by the sharing party with the relying party or the additional relying party, in accordance with an example embodiment.

FIG. 12 illustrates a flow diagram of a method 1200 for facilitating sharing of attributes of a digital document or the digital document by a sharing party (e.g., sharing party 114) with a relying party (e.g., relying party 116), in accordance with one embodiment of the present disclosure. The method 1200 depicted in the flow diagram may be executed by, for example, the server system 102. Operations of the flow diagram 1200, and combinations of operation in the flow diagram 1200, may be implemented by, for example, hardware, firmware, a processor, circuitry and/or a different device associated with the execution of software that includes one or more computer program instructions. The operations of the method 1200 are described herein with help of the server system 102. It is noted that the operations of the method 1200 can be described and/or practiced by using a system other than the server system 102. The method 1200 starts at operation 1202.

At 1202, the server system 102 receives an access request for accessing at least one attribute of a digital document. The access request is initiated at a relying party interface (e.g., the relying party interface 112) in a document sharing application. The digital document in this disclosure is a digital identity document and the attribute is a field or section of information present on the digital identity document. The access request is a request to access and endorse the attribute. The access request includes a purpose for requesting the attribute and a time period till which the attribute might be required by the relying party 116.

At 1204, the server system 102 sends the access request to a sharing party interface (e.g., the sharing party interface 110) in the document sharing application for approval of providing access to the at least one attribute of the digital document by the sharing party 114 to the relying party 116. The approval herein includes an approval to access the requested attribute from the digital identity document of the sharing party 114. The approval further includes a command to generate a machine-readable encrypted code for encrypting the attribute and the time period till which the attribute might be required by the relying party 116.

At 1206, the server system 102 upon receiving the approval from the sharing party interface 110, generates a machine-readable encrypted code for the at least one attribute of the digital document. The server system 102 further generates a decryption key to decrypt the machine-readable encrypted code.

At 1208, the server system 102 sends the machine-readable encrypted code to the relying party interface 112.

Figure 13:
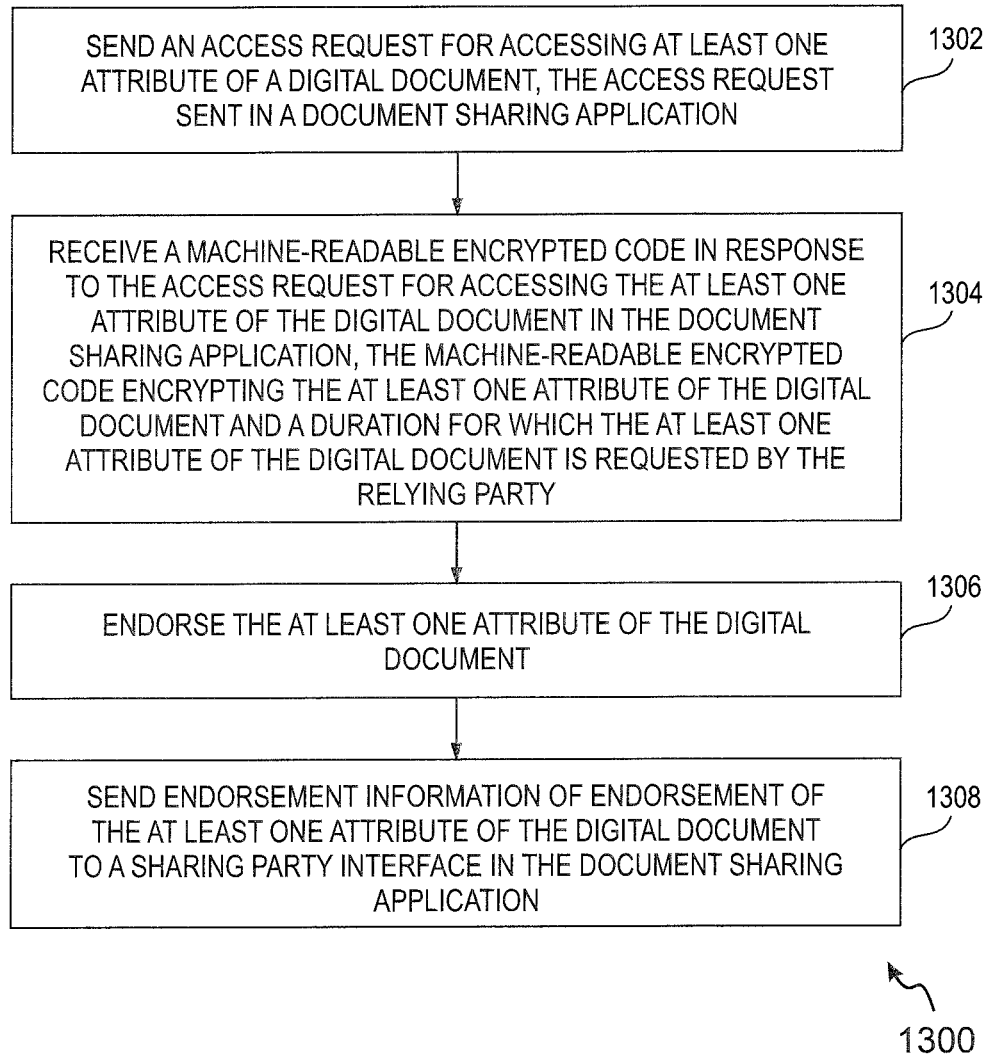
FIG. 13 illustrates a flow diagram of another method of sharing of attributes of a digital document by the sharing party with the relying party or the additional relying party, in accordance with an example embodiment.

FIG. 13 illustrates a flow diagram of another method 1300 for facilitating sharing of attributes of a digital document or the digital document by a sharing party (e.g., sharing party 114) with a relying party (e.g., relying party 116), in accordance with one embodiment of the present disclosure. The method 1300 depicted in the flow diagram may be executed by, for example, the relying party interface 112/relying party device 106. Operations of the flow diagram 1300, and combinations of operation in the flow diagram 1300, may be implemented by, for example, hardware, firmware, a processor, circuitry and/or a different device associated with the execution of software that includes one or more computer program instructions. The operations of the method 1300 are described herein with help of the relying party interface 112. It is noted that the operations of the method 1300 can be described and/or practiced by using a system other than the relying party interface 112. The method 1300 starts at operation 1302.

At 1302, the relying party interface 112 sends an access request for accessing at least one attribute of a digital document, the access request sent in a document sharing application. The access request, the attribute and the digital document are explained with reference to FIG. 12.

At 1304, the relying party interface 112 receives a machine-readable encrypted code in response to the access request for accessing the at least one attribute of the digital document in the document sharing application. The machine-readable encrypted code encrypting the at least one attribute of the digital document and a time period for which the at least one attribute of the digital document is requested by the relying party 116.

At 1306, the relying party interface 112 endorses the at least one attribute of the digital document. Endorse, herein refers to verification and attestation of the attribute as being authentic.

At 1308, the relying party interface 112 sends endorsement information of the endorsement of the at least one attribute of the digital document to a sharing party interface (e.g., the sharing party interface 110) in the document sharing application.

Figure 14:
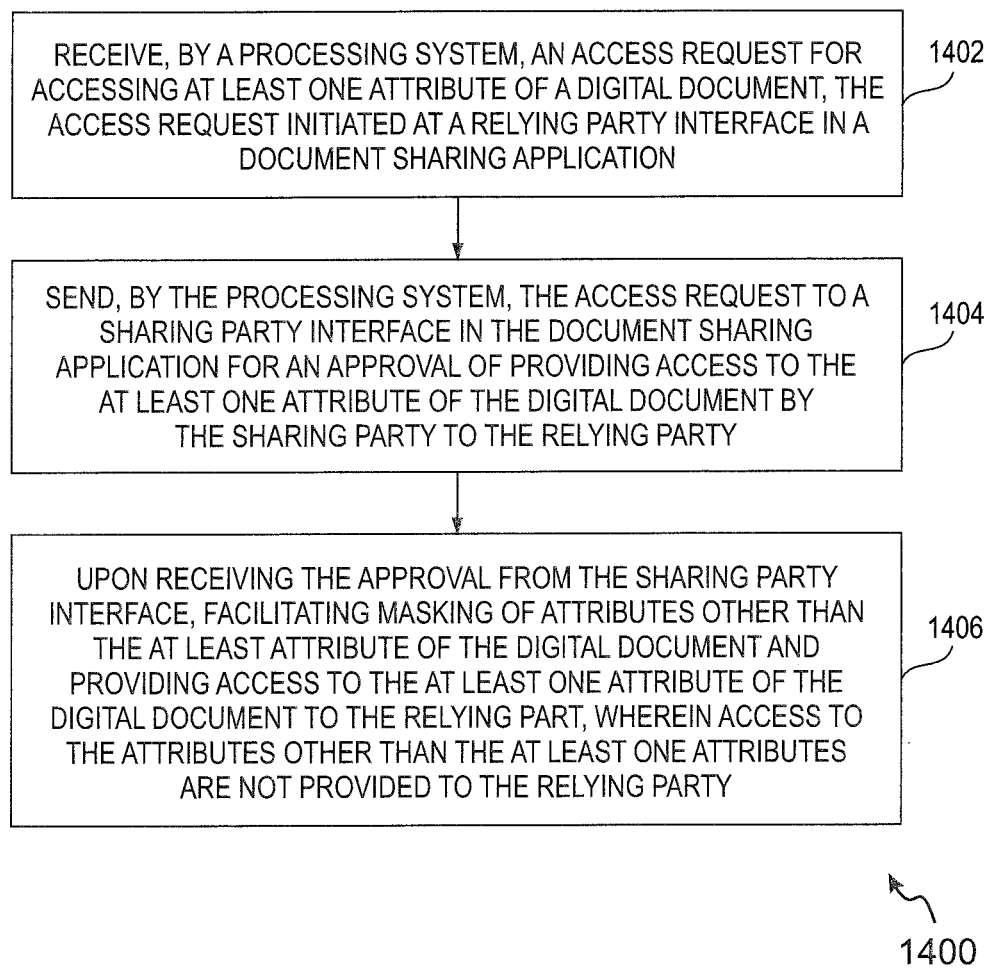
FIG. 14 illustrates a flow diagram of another method of sharing of attributes of a digital document by the sharing party with the relying party or the additional relying party, in accordance with an example embodiment.

FIG. 14 illustrates a flow diagram of another method 1400 for facilitating sharing of attributes of a digital document or the digital document by a sharing party (e.g., sharing party 114) with a relying party (e.g., relying party 116), in accordance with one embodiment of the present disclosure. The method 1400 depicted in the flow diagram may be executed by, for example, the server system 102. Operations of the flow diagram 1400, and combinations of operation in the flow diagram 1400, may be implemented by, for example, hardware, firmware, a processor, circuitry and/or a different device associated with the execution of software that includes one or more computer program instructions. The operations of the method 1400 are described herein with help of the server system 102. It is noted that the operations of the method 1400 can be described and/or practiced by using a system other than the server system 102. The method 1400 starts at operation 1402.

At 1402, the server system 102 receives an access request for accessing at least one attribute of a digital document. The access request is initiated at a relying party interface (e.g., the relying party interface 112) in a document sharing application. The access request is a request to access and endorse the at least one attribute of the digital document. The access request includes a purpose for requesting the attribute and a time period (i.e. the pre-defined time period) till which the attribute might be required by the relying party 116.

At 1404, the server system 102 sends the access request to a sharing party interface (e.g., the sharing party interface 110) in the document sharing application for approval of providing access to the at least one attribute of the digital document by the sharing party 114 to the relying party 116. The approval herein includes an approval to access the requested attribute from the digital identity document of the sharing party 114. The approval inherently (or further) includes a command to mask attributes other than the at least attribute of the digital document.

At 1406, the server system 102, upon receiving the approval from the sharing party interface 110, facilitates masking of attributes other than the at least attribute of the digital document and providing access to the at least one attribute to the relying party. The access to the attributes other than the at least one attribute is not provided to the relying party.

Figure 15:
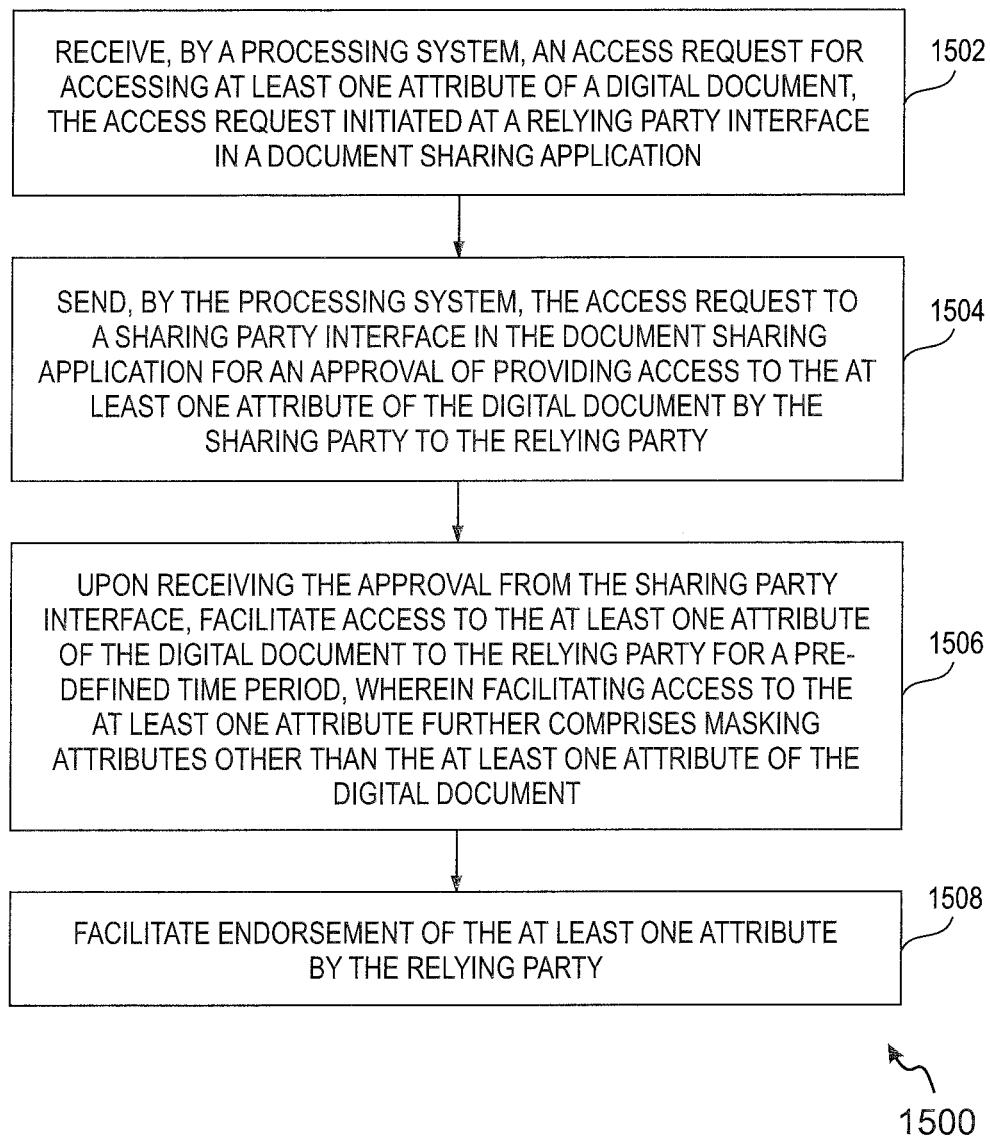
FIG. 15 illustrates a flow diagram of another method of sharing of attributes of a digital document by the sharing party with the relying party or the additional relying party, in accordance with another example embodiment.

FIG. 15 illustrates a flow diagram of another method 1500 for facilitating sharing of attributes of a digital document or the digital document by a sharing party (e.g., sharing party 114) with a relying party (e.g., relying party 116), in accordance with one embodiment of the present disclosure. The method 1500 depicted in the flow diagram may be executed by, for example, the server system 102. Operations of the flow diagram 1500, and combinations of operation in the flow diagram 1500, may be implemented by, for example, hardware, firmware, a processor, circuitry and/or a different device associated with the execution of software that includes one or more computer program instructions. The operations of the method 1500 are described herein with help of the server system 102. It is noted that the operations of the method 1500 can be described and/or practiced by using a system other than the server system 102. The method 1500 starts at operation 1502.

At 1502, the server system 102 receives an access request for accessing at least one attribute of a digital document. The access request is initiated at a relying party interface (e.g., the relying party interface 112) in a document sharing application. The access request is a request to access and endorse the at least one attribute of the digital document. The access request includes a purpose for requesting the attribute and a time period till which the attribute might be required by the relying party 116.

At 1504, the server system 102 sends the access request to a sharing party interface (e.g., the sharing party interface 110) in the document sharing application for approval of providing access to the at least one attribute of the digital document by the sharing party 114 to the relying party 116. The approval herein includes an approval to access the requested attribute from the digital identity document of the sharing party 114. The approval further includes a command to mask attributes other than the at least attribute of the digital document.

At 1506, the server system 102, upon receiving the approval from the sharing party interface 110, facilitates access to the at least one attribute of the digital document to the relying party for a pre-defined time period. Facilitating access to the at least one attribute further comprises masking attributes other than the at least one attribute of the digital document.

At 1508, the server system 102 facilitates endorsement of the at least one attribute by the relying party 116.

Figure 16:
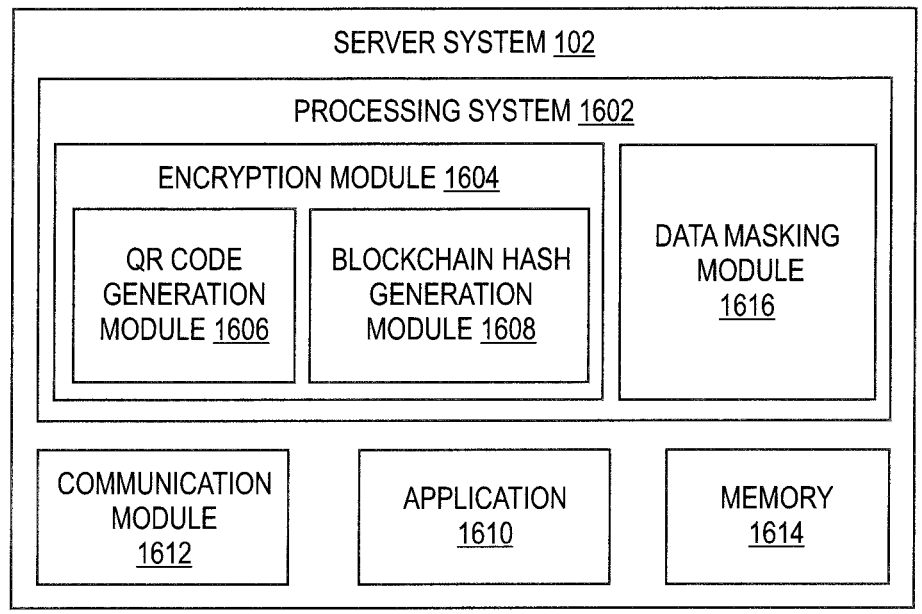
FIG. 16 is a simplified block diagram showing various components of a server system, in accordance with an example embodiment.

FIG. 16 is a simplified block diagram showing various components of the server system 102, in accordance with an example embodiment. The server system 102 includes a processing system 1602 and a memory 1614. The processing system 1602 includes an application 1610 for facilitating sharing of attributes of a digital document or a digital document by a sharing party (e.g., the sharing party 114) with a relying party (e.g., relying party 116). The application 1610 is an example of the document sharing application. The application 1610 is managed by the server system 102 and it can be readily made available at any compatible device such as the sharing party device 104, the relying party device 106 and the second relying party device (e.g., 350 and 950).

The processing system 1602 further includes an encryption module 1604. Computer executable codes and instructions may be stored in the memory/storage 1614 of the server system 102, wherein the computer executable codes/instructions are executed by the processing system 1602/encryption module 1604 to perform encryption of data using one or more encryption techniques. These instructions may be loaded onto a general-purpose computer, special purpose computer, or other programmable data processing apparatus to cause a system (e.g., the server system 102), such that the set of instructions when executed on the computer or other programmable data processing apparatus create a means for implementing the functions specified in the flowchart (1200, 1300, 1400 and 1500) or blocks.

The encryption module 1604 further includes a QR code generation module 1606 and a blockchain hash generation module 1608. The encryption module 1604 may include additional modules for various encryption techniques not limited to the QR code generation module 1606 and the blockchain hash generation module 1608. The encryption module 1604 may be configured using hardware elements, software elements, firmware elements and/or a combination thereof.

The processing system 1602 further includes a data masking module 1616. The data masking module 1616 includes instructions or computer executable codes. The instruction and codes relate to one or more techniques used in art for hiding original data with random characters or data in a text document or an age. Conventionally, irrelevant or sensitive data may be masked by substituting such data with random values and characters or by blurring the corresponding data while display. Additionally, various image and document editing tools/algorithms may be used for masking of data.

The processing system 1602 may, as an example, include a signal processor, microprocessor, ASIC, or other control and processing logic circuitry) for performing such tasks as signal coding, data processing, image processing, input/output processing, power control, and/or other functions. An operating system controls the allocation and usage of the components of the user device and support for one or more applications programs (see, document sharing application), that implements one or more of the innovative features described herein.

The encryption module 1604 receives the command from the sharing party interface 110 in the application for generation of the machine-readable encryption code. The command also includes an approval to access the requested attribute by the server system 102. Upon reception of the command, the encryption module 1604 accesses the requested attribute of a digital document and encrypts the attribute or attribute data.

The server system 102 further includes a communication module 1612. The communication module 1612 facilitates communication of the server system 102 with the sharing party device 104, the relying party device 106 and the second relying party device 350 via the communication network 108.

Figure 17:
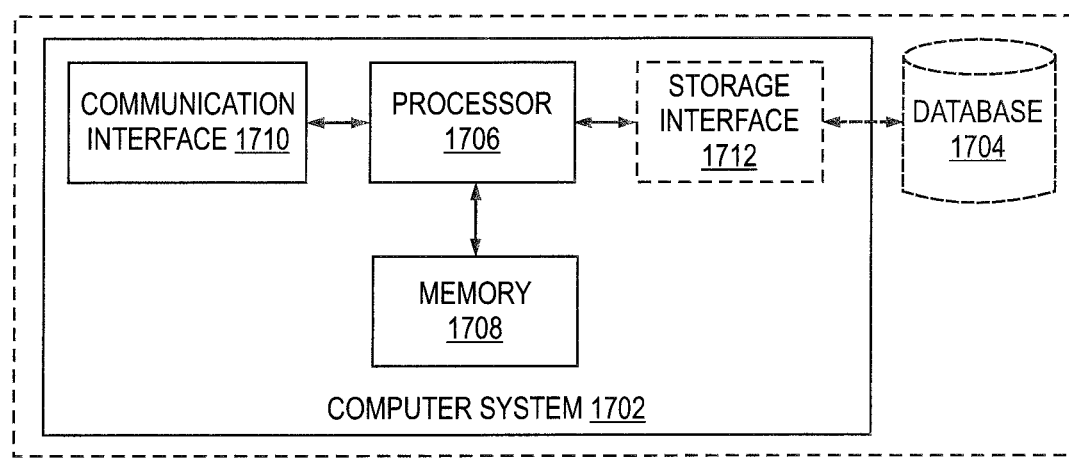
FIG. 17 is a simplified block diagram of the server system used for facilitating sharing of attributes of a digital document by the sharing party with the relying party or the additional relying party, in accordance with an example embodiment.

FIG. 17 is a simplified block diagram of a server system 1700, in accordance with one embodiment of the present disclosure. The server system 1500 is an example of the server system 102 and includes computer system 1702 and one or more databases, such as a database 1704.

The computer system 1702 includes a processor 1706 for executing instructions. Instructions may be stored in, for example, but not limited to, a memory 1708. The processor 1706 may include one or more processing units (e.g., in a multi-core configuration). The processor 1706 is operatively coupled to a communication interface 1710 such that computer system 1702 can communicate with the sharing party device 104, the relying party device 106 and the second relying party device (see, 350 and 950). For example, the communication interface 1710 may receive the access request and the additional access request from the relying party device 106 and the second relying party device 350.

The processor 1706 may also be operatively coupled to the database 1704. The database 1704 is any computer-operated hardware suitable for storing and/or retrieving data. The database 1704 may include multiple storage units such as hard disks and/or solid-state disks in a redundant array of inexpensive disks (RAID) configuration. The database 1704 may include, but not limited to, a storage area network (SAN) and/or a network attached storage (NAS) system. In some embodiments, the database 1504 is integrated within computer system 1702. For example, computer system 1702 may include one or more hard disk drives as database 1704. In other embodiments, database 1704 is external to computer system 1702 and may be accessed by the computer system 1702 using a storage interface 1712. The storage interface 1712 is any component capable of providing the processor 1706 with access to the database 1704. The storage interface 1712 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1706 with access to the database 1704.

Figure 18:
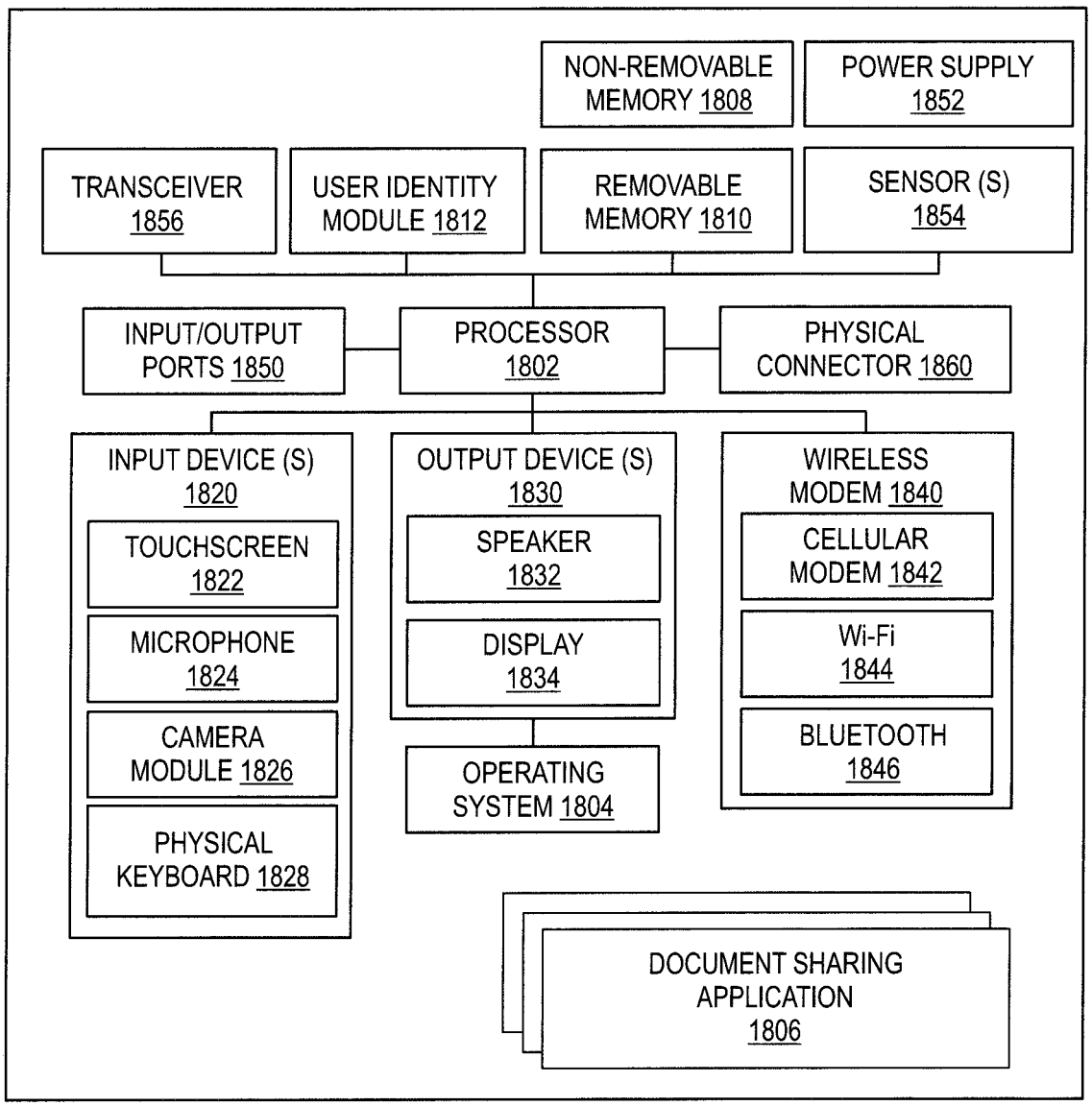
FIG. 18 shows a simplified block diagram of a sharing party device or a relying party device, for example, a mobile phone capable of implementing at least some embodiments of the present disclosure.

FIG. 18 shows simplified block diagram of a user device, such as the relying party device 106, the sharing party device 104 or the second relying party device (see, 350 in FIG. 3 and 950 in FIGS. 9A-9B). The user device 1800, for example, can be a desktop computer or a mobile phone capable of implementing the various embodiments of the present disclosure. The user device 1800 is depicted to include a document sharing application 1806.

It should be understood that the user device 1800 as illustrated and hereinafter described is merely illustrative of one type of device and should not be taken to limit the scope of the embodiments. As such, it should be appreciated that at least some of the components described below in connection with that the user device 1800 may be optional and thus in an example embodiment may include more, less or different components than those described in connection with the example embodiment of the FIG. 18. As such, among other examples, the user device 1800 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1800 includes a controller or a processor 1802 (e.g., a signal processor, microprocessor, ASIC, or other control and processing logic circuitry) for performing such tasks as signal coding, data processing, image processing, input/output processing, power control, and/or other functions. An operating system 1804 controls the allocation and usage of the components of the user device 1800 and support for one or more applications programs (see, document sharing applications 1806), that implements one or more of the innovative features described herein. The document sharing application 1806 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1800 includes one or more memory components, for example, a non-removable memory 1808 and/or removable memory 1810. The non-removable memory 1808 and/or removable memory 1810 may be collectively known as database in an embodiment. The non-removable memory 1808 can include RAM, ROM, flash memory, a hard disk, or other well-known memory storage technologies. The removable memory 1810 can include flash memory, smart cards, or a Subscriber Identity Module (SIM). The one or more memory components can be used for storing data and/or code for running the operating system 1804 and the applications 1806. The user device 1800 may further include a user identity module (UIM) 1812. The UIM 1812 may be a memory device having a processor built in. The UIM 1812 may include, for example, a subscriber identity module (SIM), a universal integrated circuit card (UICC), a universal subscriber identity module (USIM), a removable user identity module (R-UIM), or any other smart card. The UIM 1812 typically stores information elements related to a mobile subscriber. The UIM 1812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1800 can support one or more input devices 1820 and one or more output devices 1830. Examples of the input devices 1820 may include, but are not limited to, a touch screen/a display screen 1822 (e.g., capable of capturing finger tap inputs, finger gesture inputs, multi-finger tap inputs, multi-finger gesture inputs, or keystroke inputs from a virtual keyboard or keypad), a microphone 1824 (e.g., capable of capturing voice input), a camera module 1826 (e.g., capable of capturing still picture images and/or video images) and a physical keyboard 1828. Examples of the output devices 1830 may include, but are not limited to a speaker 1832 and a display 1834. Other possible output devices can include piezoelectric or other haptic output devices. Some devices can serve more than one input/output function. For example, the touch screen 1822 and the display 1834 can be combined into a single input/output device.

A wireless modem 1840 can be coupled to one or more antennas (not shown in the FIG. 18) and can support two-way communications between the processor 1802 and external devices, as is well understood in the art. The wireless modem 1840 is shown generically and can include, for example, a cellular modem 1842 for communicating at long range with the mobile communication network, a Wi-Fi compatible modem 1844 for communicating at short range with an external Bluetooth-equipped device or a local wireless data network or router, and/or a Bluetooth-compatible modem 1846. The wireless modem 1840 is typically configured for communication with one or more cellular networks, such as a GSM network for data and voice communications within a single cellular network, between cellular networks, or between the mobile phone 1800 and a public switched telephone network (PSTN).

The user device 1800 can further include one or more input/output ports 1850 for establishing connection with peripheral devices including a power supply 1852, one or more sensors 1854 for example, an accelerometer, a gyroscope, a compass, or an infrared proximity sensor for detecting the orientation or motion of the user device 1800 and biometric sensors for scanning biometric identity of an authorized user, a transceiver 1856 (for wirelessly transmitting analog or digital signals) and/or a physical connector 1860, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 18 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1500 (e.g., server system 102) various components such as the computer system 1502 and the database 1504 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Without in any way limiting the scope, interpretation, or application of the claims appearing below, a technical effect of one or more of the example embodiments disclosed herein is to provide computer implemented methods and server systems for sharing digital identity documents by a sharing party with one or more relying parties. The system provides a solution in form of an application, which enables controlling of identity information of the sharing party and granting view rights to relying parties. The solution provides options to the sharing party to amend and control as to who has access to their identity information. As such threats related to phishing of identity information are mitigated to a substantial extent. The application provides a cost-effective solution for relying parties as they do not have to perform identity verification of the sharing party from the scratch and one relying party depends on another relying party's attestation and verification of the identity documents thereby enabling faster verification of identity documents.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method for facilitating sharing of digital documents between a sharing party and a relying party, the method comprising:
   receiving, by a processing system from a relying party device, an access request for accessing at least one attribute of a digital document, the access request comprising a purpose for accessing the at least one attribute and initiated at a relying party interface in a document sharing application;
   sending, by the processing system to a sharing party device, the access request via a sharing party interface in the document sharing application for an approval of providing access to the at least one attribute of the digital document by the sharing party to the relying party;
   masking, by the processing system upon receiving the approval from the sharing party interface of the sharing party device, attributes other than the at least one attribute of the digital document;
   generating, by the processing system, a machine-readable encrypted code for the at least one attribute of the digital document; and
   sending, by the processing system, the machine-readable encrypted code to the relying party interface of the replying party device.

2. The method of claim 1, wherein the access request further comprises a time period for which the at least one attribute of the digital document is requested by the relying party.

3. The method of claim 2, wherein sending the machine-readable encrypted code further comprises:
   generating, by the processing system, the machine-readable encrypted code for the at least one attribute with validity of the time period; and
   generating, by the processing system, a decryption key for decrypting the machine-readable encrypted code at the relying party interface.

4. The method of claim 1, wherein the machine-readable encrypted code is at least one of:
   a QR code; and
   a blockchain hash.

5. The method of claim 1, wherein sending the machine-readable encrypted code to the relying party interface further comprises facilitating, by the processing system, provision of control to allow viewing and endorsing the at least one attribute by the relying party upon retrieval of the at least one attribute by decrypting the machine-readable encrypted code by the relying party.

6. The method of claim 5, further comprising receiving, by the processing system from the relying party interface, an endorsement information in response to endorsing the at least one attribute of the digital document by the relying party.

7. The method of claim 6, wherein the endorsement information of the endorsement of the at least one attribute of the digital document comprises an endorsement message and an identity of the relying party who has endorsed the at least one attribute of the digital document.

8. The method of claim 7, further comprising facilitating sharing of the endorsement information for viewing by an additional relying party in response to receiving, by the processing system, an additional access request from the additional relying party.

9. The method of claim 7, wherein the endorsement information comprises a count of a number of times the at least one attribute is endorsed.

10. The method of claim 1, further comprising:
    receiving, by the processing system, a view request for viewing the at least one attribute of the digital document, the view request initiated at the relying party interface in the document sharing application, the digital document stored in a memory of a sharing party device;
    sending, by the processing system, the view request to the sharing party interface in the document sharing application for approval of providing access to viewing the digital document by the sharing party to the relying party; and
    upon receiving the approval from the sharing party interface, sending, by the processing system, the digital document to the relying party interface.

11. The method of claim 10, wherein sending the digital document to the relying party interface further comprises facilitating provision of control to allow only viewing of the digital document by the relying party.

12. A server system for facilitating sharing of digital documents between a sharing party and a relying party, the server system comprising:
    a memory comprising stored instructions; and
    at least one processor, configured to execute the stored instructions to cause the server system to perform at least:
        receiving an access request from a relying party device for accessing at least one attribute of a digital document, the access request comprising a purpose of accessing the at least one attribute and initiated at a relying party interface in a document sharing application;

sending the access request to a sharing party interface in a document sharing application running on a sharing party device for an approval of providing access to the at least one attribute of the digital document by the sharing party to the relying party;

masking, upon receiving the approval from the sharing party interface of the sharing party device, attributes other than the at least one attribute of the digital document;

generating a machine-readable encrypted code for the at least one attribute of the digital document; and sending the machine-readable encrypted code to the relying party interface of the replying party device.

13. The server system of claim 12, wherein the access request further comprises a time period for which the at least one attribute of the digital document will be accessed by the relying party.

14. The server system of claim 13, wherein sending the machine-readable encrypted code to the relying party interface comprises the server system performing at least:

generating the machine-readable encrypted code for the at least one attribute with validity of the time period; and generating a decryption key for decrypting the machine-readable encrypted code at the relying party interface.

15. The server system of claim 13, wherein the server system is further caused to facilitate deletion of the machine-readable encrypted code for the at least one attribute after the expiry of the time period.

16. The server system of claim 12, wherein sending the machine-readable encrypted code to the relying party interface comprises the server system being caused to perform facilitating provision of control to allow viewing and endorsement of the at least one attribute solely by the relying party.

17. The server system of claim 16, wherein the server system is further caused to receive an endorsement information of the endorsement of the at least one attribute of the digital document by the relying party, the endorsement information comprising an endorsement message and an identity of the relying party who has endorsed the at least one attribute of the digital document.

18. The server system of claim 12, further caused to perform:

receiving a view request for viewing the digital document, the view request initiated at the relying party interface in the document sharing application, the digital document stored in a memory of a sharing party device;

sending the view request to the sharing party interface in the document sharing application for approval of providing access to viewing the digital document by the sharing party to the relying party; and upon receiving the approval from the sharing party interface, sending the digital document to the relying party interface.

19. The server system of claim 18, wherein for sending the digital document to the relying party interface, the server system is caused to facilitate provision of control to the sharing party to allow viewing of the digital document solely by the relying party.

* * * * *